(12) United States Patent
Yonezawa et al.

(10) Patent No.: US 11,740,443 B2
(45) Date of Patent: Aug. 29, 2023

(54) ZOOM LENS AND IMAGING APPARATUS

(71) Applicant: FUJIFILM Corporation, Tokyo (JP)

(72) Inventors: Masaru Yonezawa, Saitama (JP); Motoari Ota, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 286 days.

(21) Appl. No.: 17/016,916

(22) Filed: Sep. 10, 2020

(65) Prior Publication Data

US 2021/0088763 A1  Mar. 25, 2021

(30) Foreign Application Priority Data

Sep. 20, 2019 (JP) .................................. 2019-171643

(51) Int. Cl.
*G02B 15/14* (2006.01)
*G02B 27/00* (2006.01)
*G02B 15/20* (2006.01)

(52) U.S. Cl.
CPC .  *G02B 15/1451* (2019.08); *G02B 15/145129* (2019.08); *G02B 15/20* (2013.01); *G02B 27/0025* (2013.01)

(58) Field of Classification Search
CPC ................ G02B 15/1451; G02B 15/20; G02B 15/145129
USPC .......................................................... 359/683
See application file for complete search history.

(56) References Cited

U.S. PATENT DOCUMENTS

| 9,042,029 | B2 * | 5/2015 | Takemoto | G02B 15/145129 |
| | | | | 359/676 |
| 9,979,892 | B2 * | 5/2018 | Wada | G02B 15/145125 |
| 10,746,976 | B2 * | 8/2020 | Ota | G02B 15/145129 |
| 10,838,180 | B2 * | 11/2020 | Tanaka | G02B 15/145129 |
| 10,955,647 | B2 * | 3/2021 | Ogawa | G02B 13/0045 |
| 11,187,876 | B2 * | 11/2021 | Ogawa | G02B 15/144109 |
| 2015/0355436 | A1 | 12/2015 | Shimada et al. | |
| 2016/0259155 | A1 | 9/2016 | Shimada et al. | |
| 2017/0343780 | A1 | 11/2017 | Lee | |
| 2019/0025557 | A1 | 1/2019 | Ota et al. | |

(Continued)

FOREIGN PATENT DOCUMENTS

| EP | 2662719 A1 * | 11/2013 | ............. G02B 13/02 |
| JP | 2016-012118 A | 1/2016 | |
| JP | 2016-164629 A | 9/2016 | |

(Continued)

OTHER PUBLICATIONS

An Office Action; "Notice of Reasons for Refusal," mailed by the Japanese Patent Office dated Jun. 28, 2022, which corresponds to Japanese Patent Application No. 2019-171643 and is related to U.S. Appl. No. 17/016,916; with English language translation.

*Primary Examiner* — Zachary W Wilkes
(74) *Attorney, Agent, or Firm* — Studebaker & Brackett PC

(57) ABSTRACT

A zoom lens consists of, in order from an object side, a positive first lens group, a negative moving lens group, a first positive moving lens group, a second positive moving lens group, and a subsequent lens group including a stop. During zooming, the first lens group is not moved, and the negative moving lens group, the first positive moving lens group, and the second positive moving lens group are moved. The first positive moving lens group consists of a positive single lens and a cemented lens obtained by cementing a positive lens and a negative lens. The zoom lens satisfies a predetermined conditional expression.

16 Claims, 13 Drawing Sheets

(56) References Cited

U.S. PATENT DOCUMENTS

2019/0265448 A1* 8/2019 Ogawa .................. G02B 13/02
2021/0033833 A1* 2/2021 Ogawa ........... G02B 15/145129

FOREIGN PATENT DOCUMENTS

JP     2019-148759 A    9/2019
WO   2017/170047 A1   10/2017

* cited by examiner

FIG. 2
EXAMPLE 1
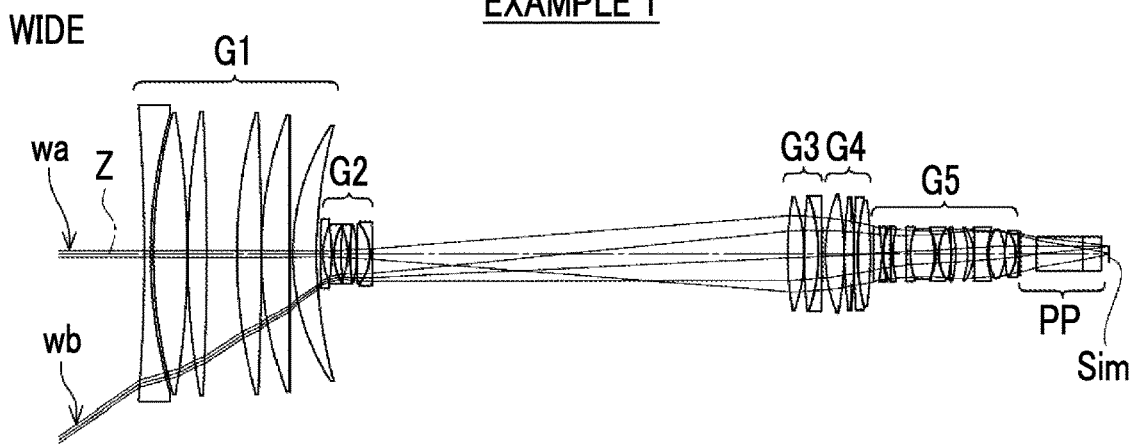
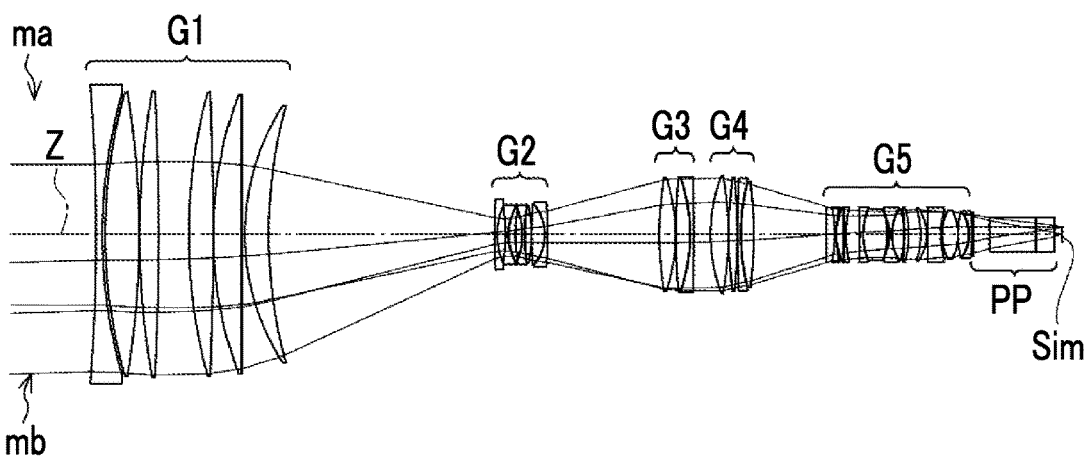
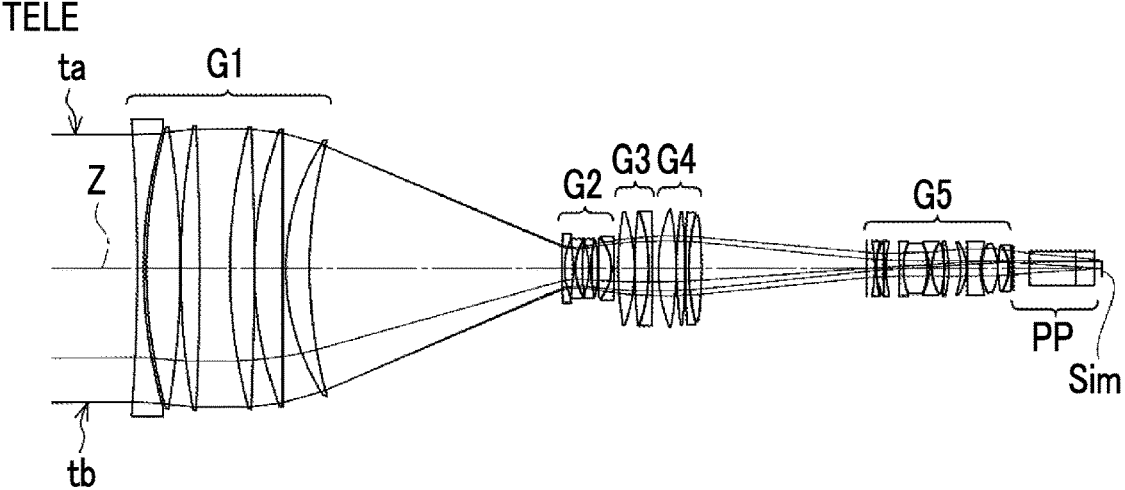

FIG. 3
EXAMPLE 1
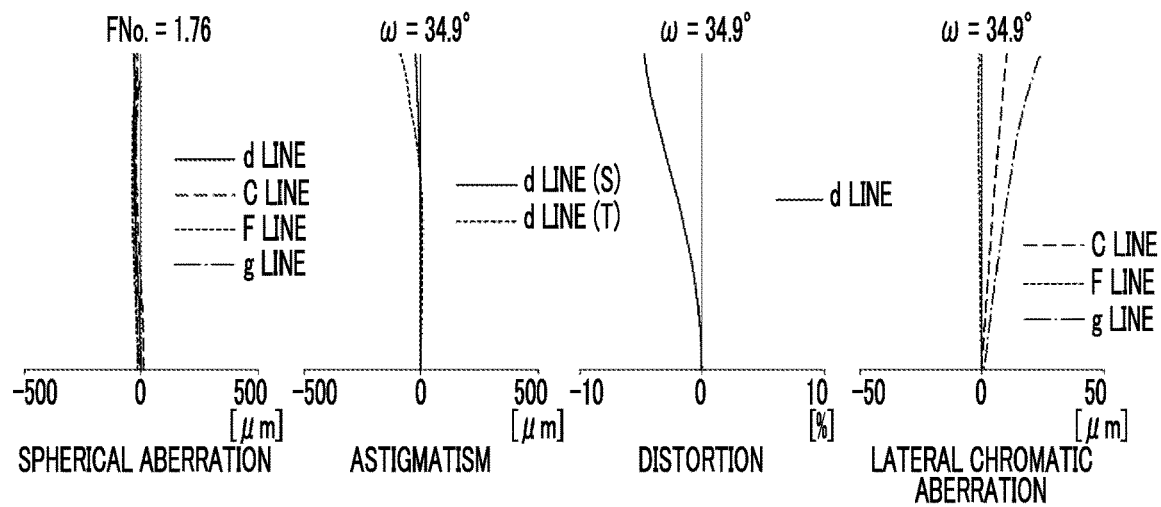
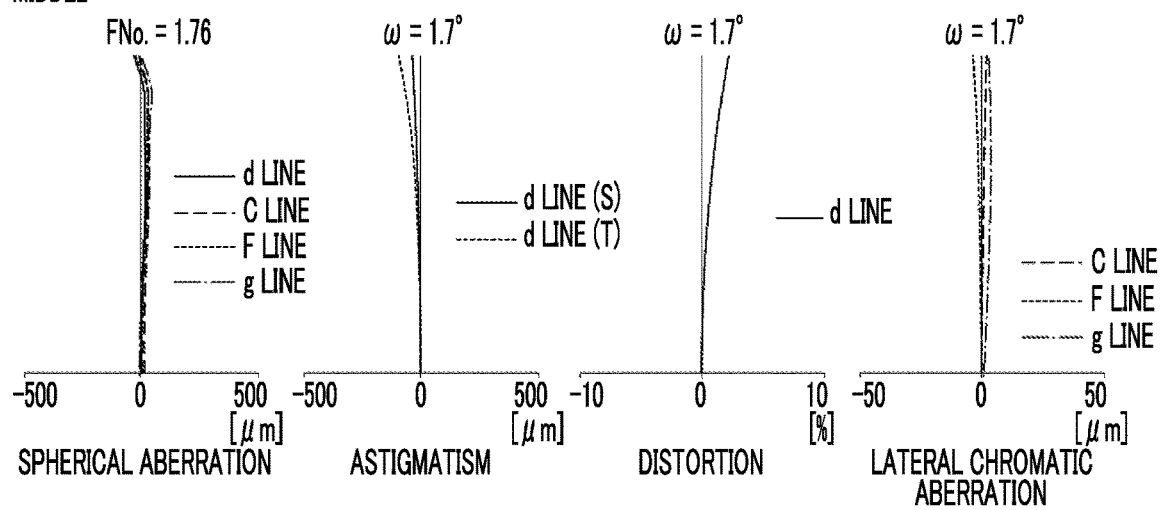
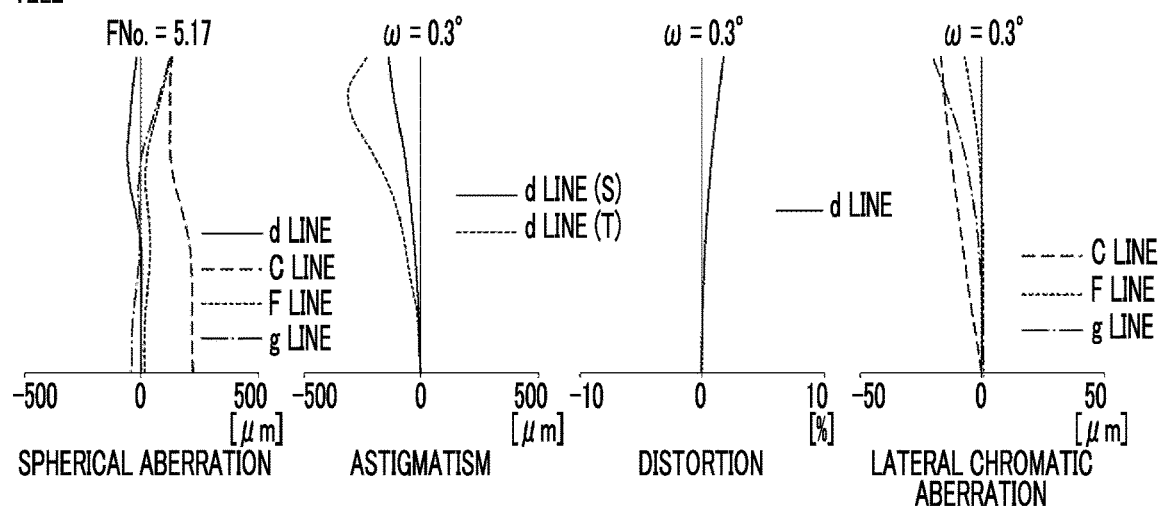

EXAMPLE 2

FIG. 5
EXAMPLE 2
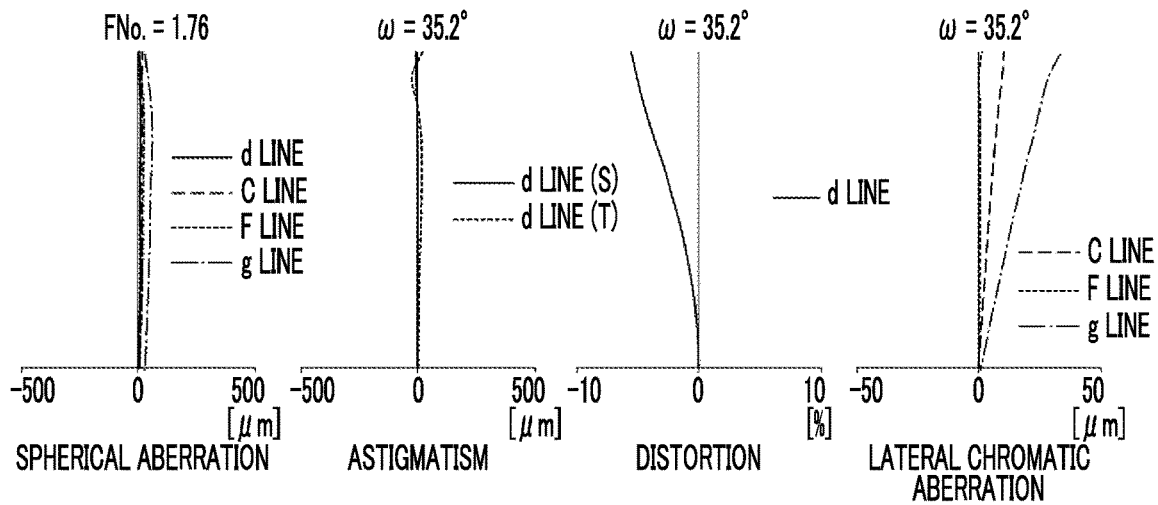
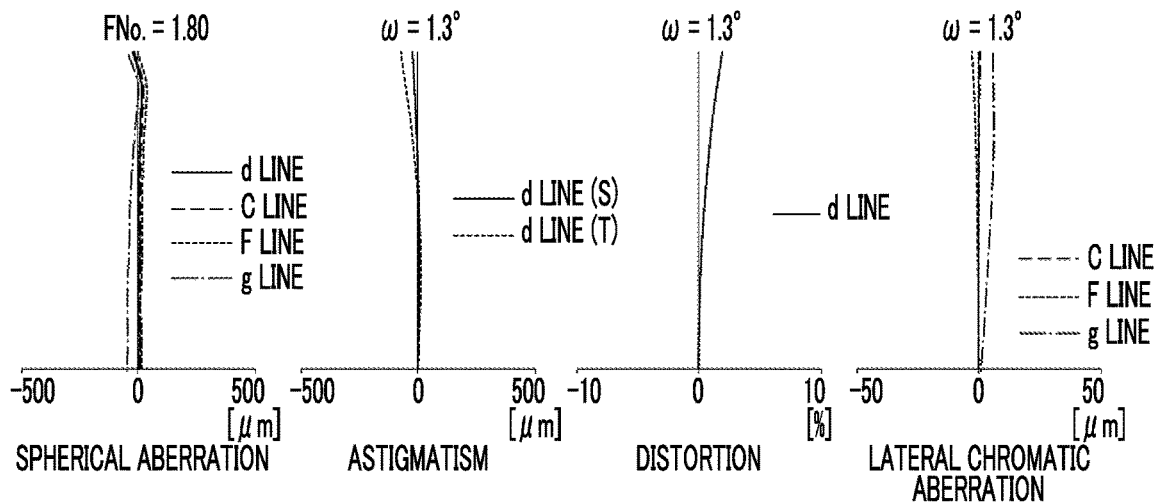
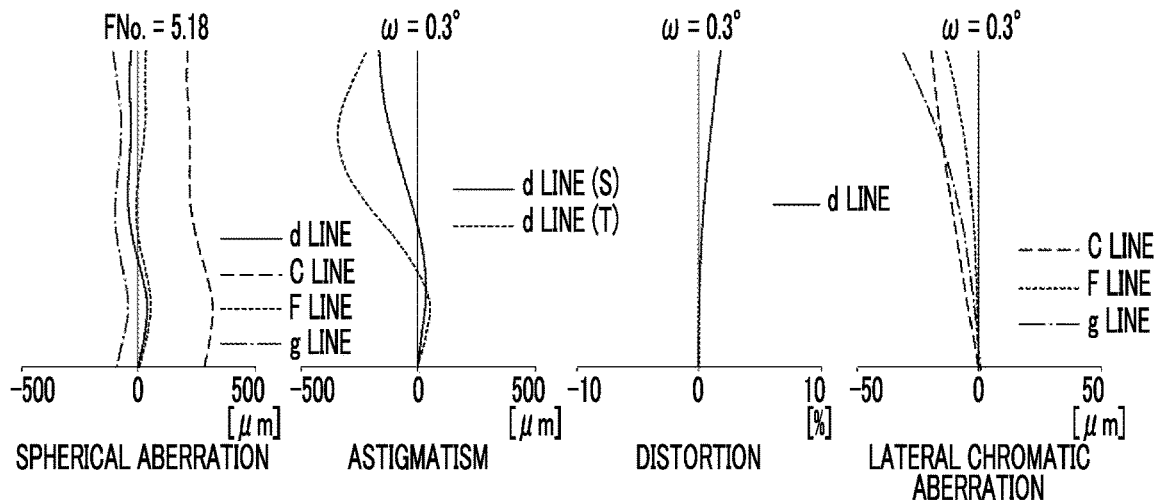

EXAMPLE 3

FIG. 7
EXAMPLE 3
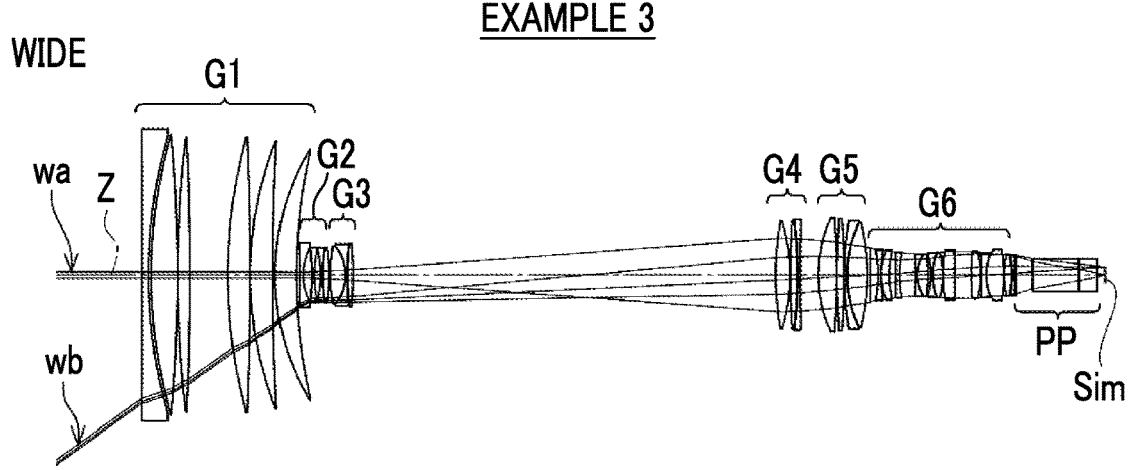
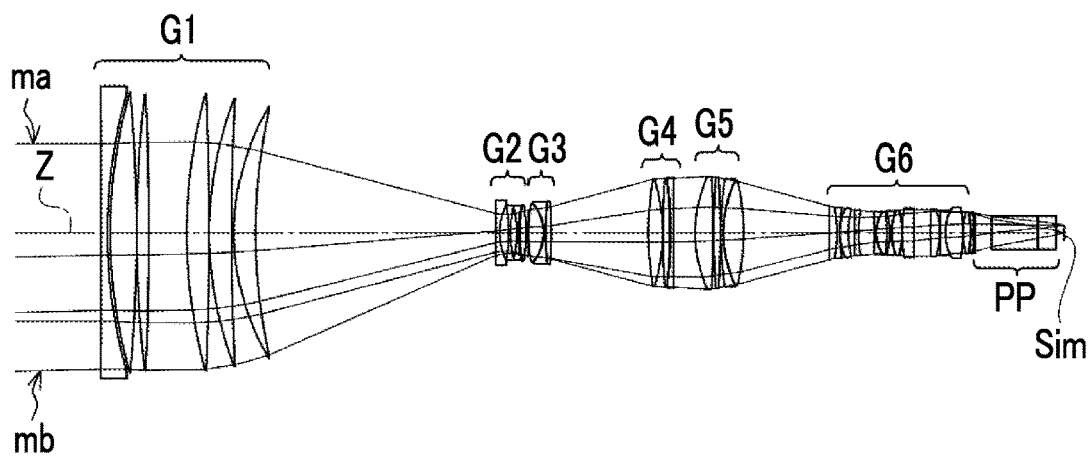
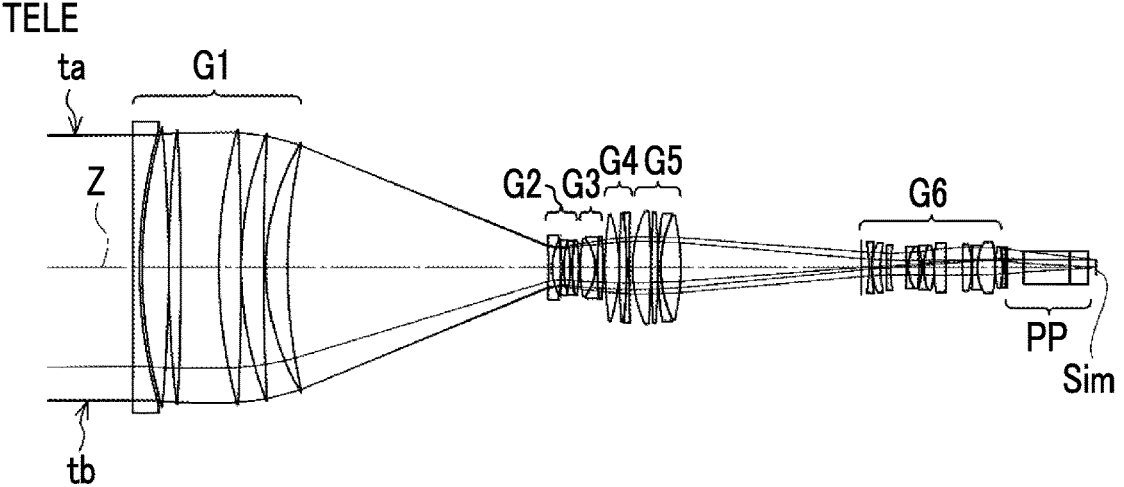

FIG. 8
EXAMPLE 3
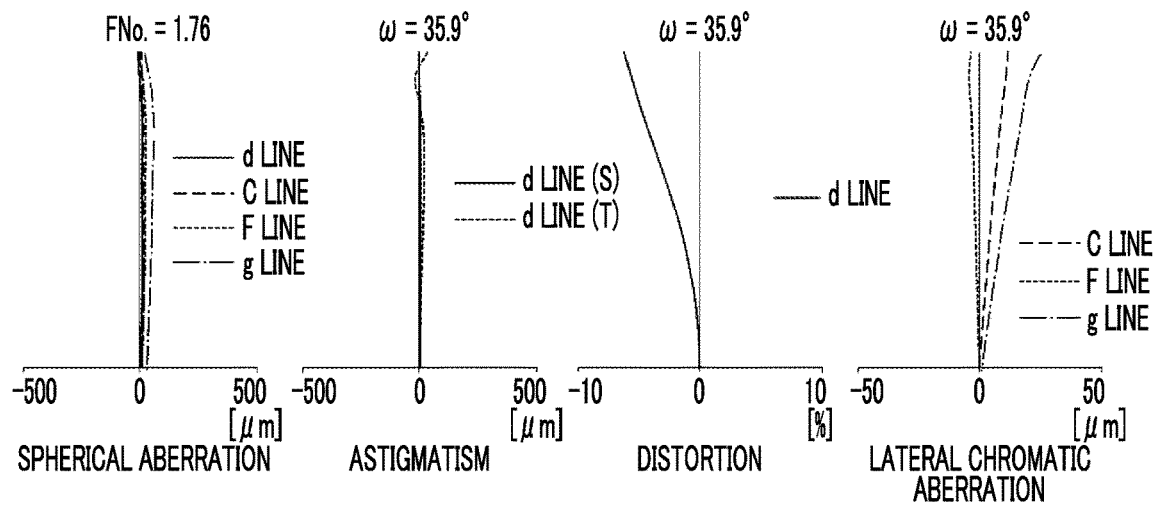
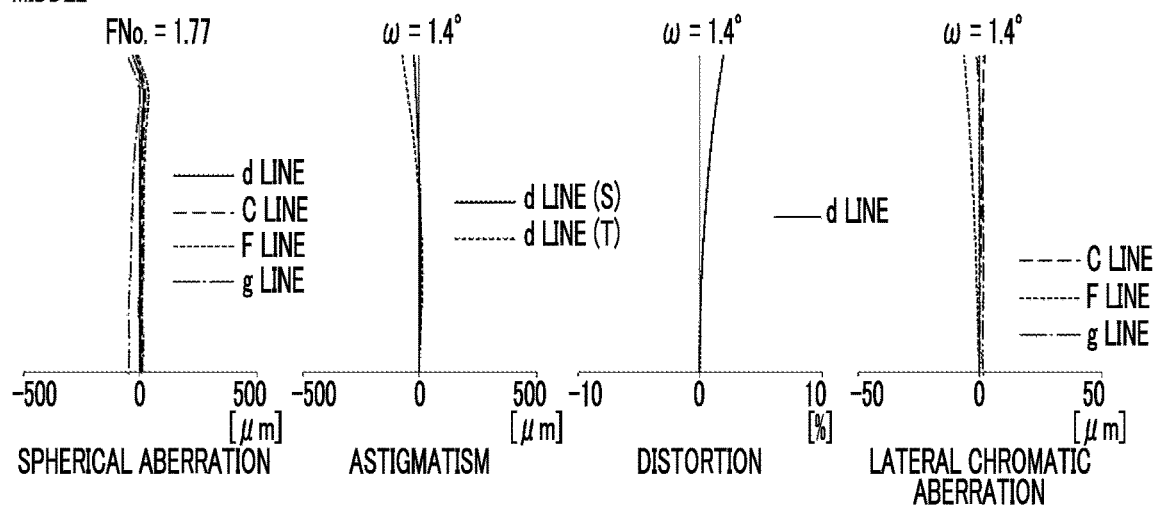
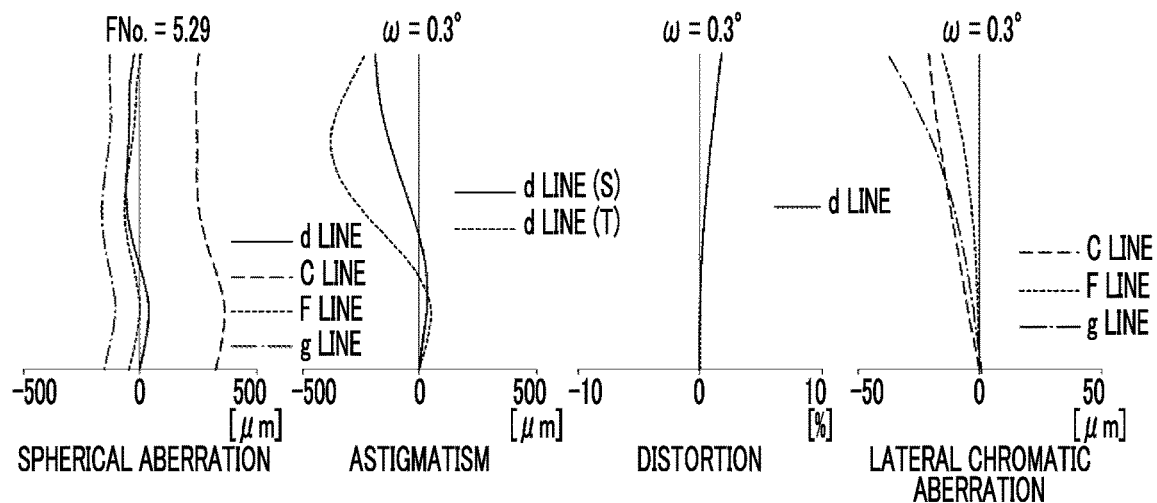

EXAMPLE 4

FIG. 10
EXAMPLE 4
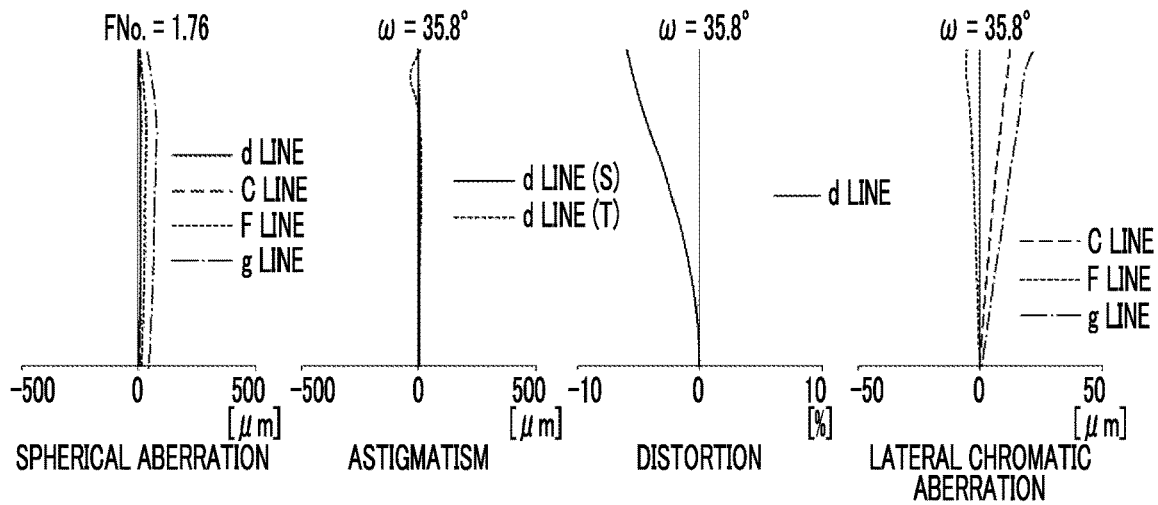
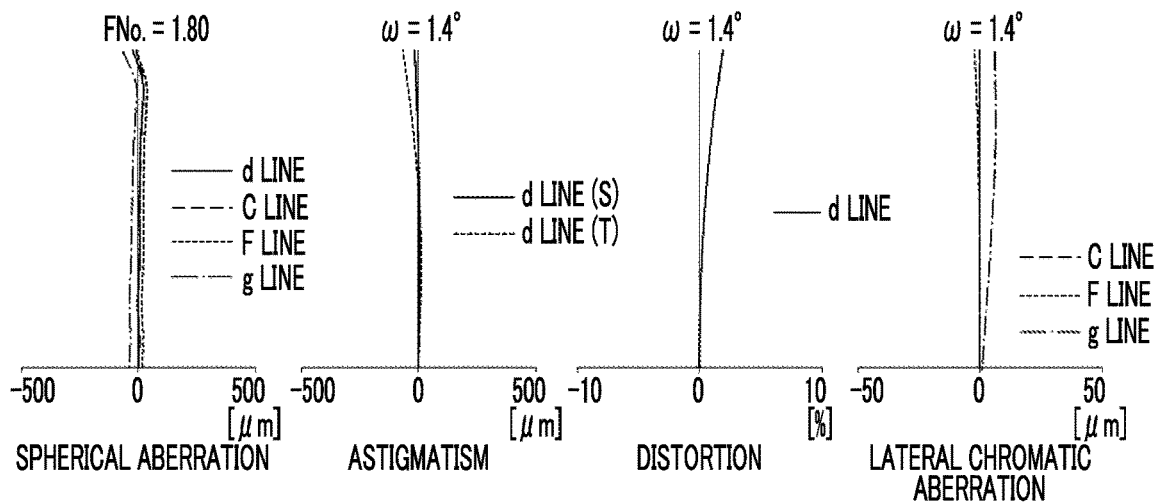
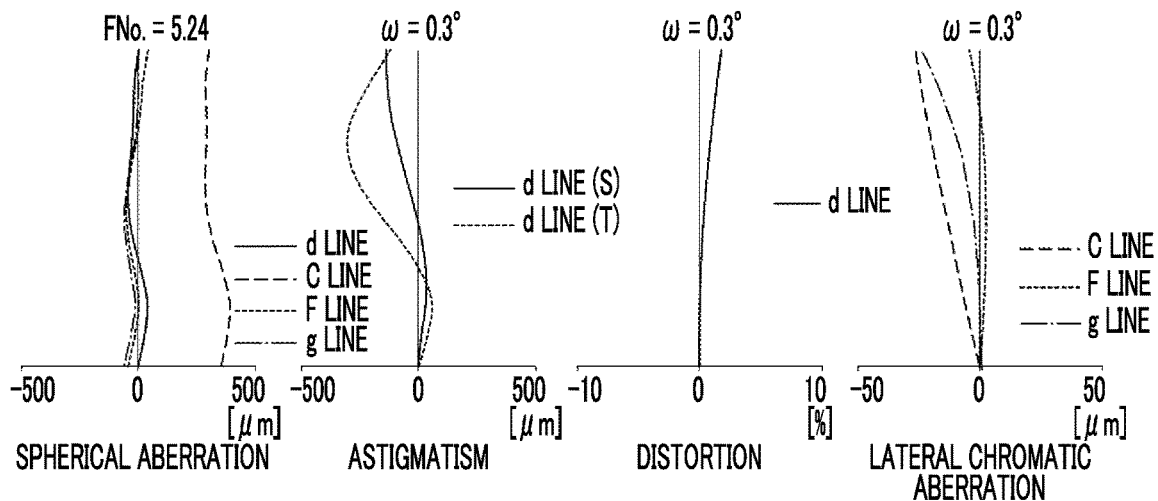

EXAMPLE 5

FIG. 12
EXAMPLE 5
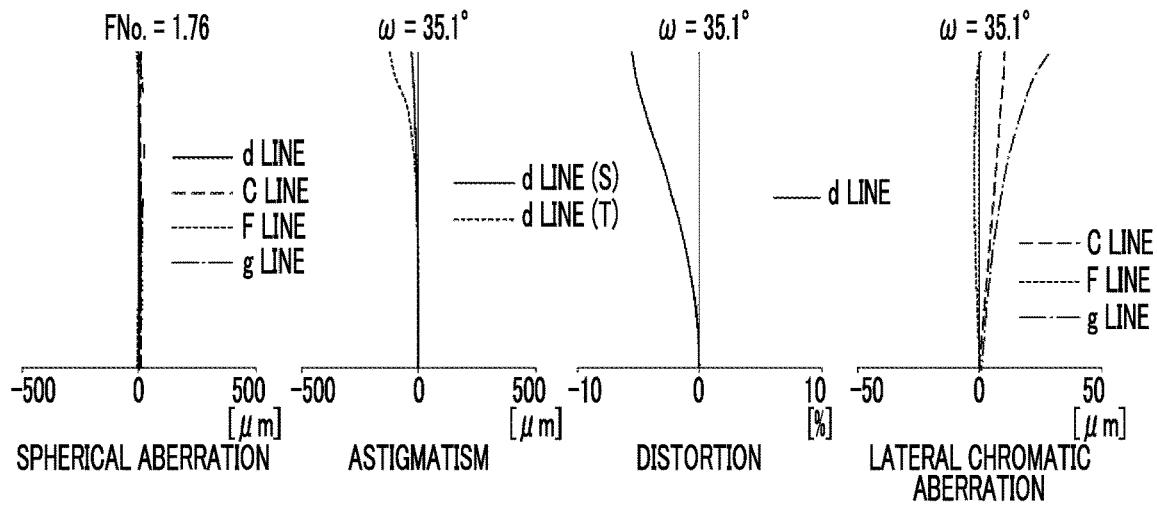
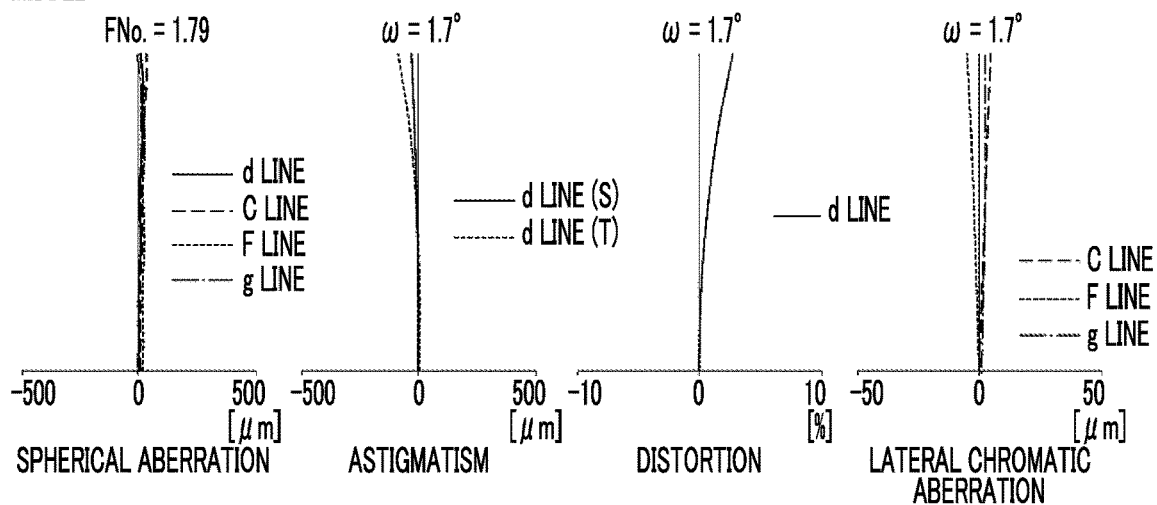
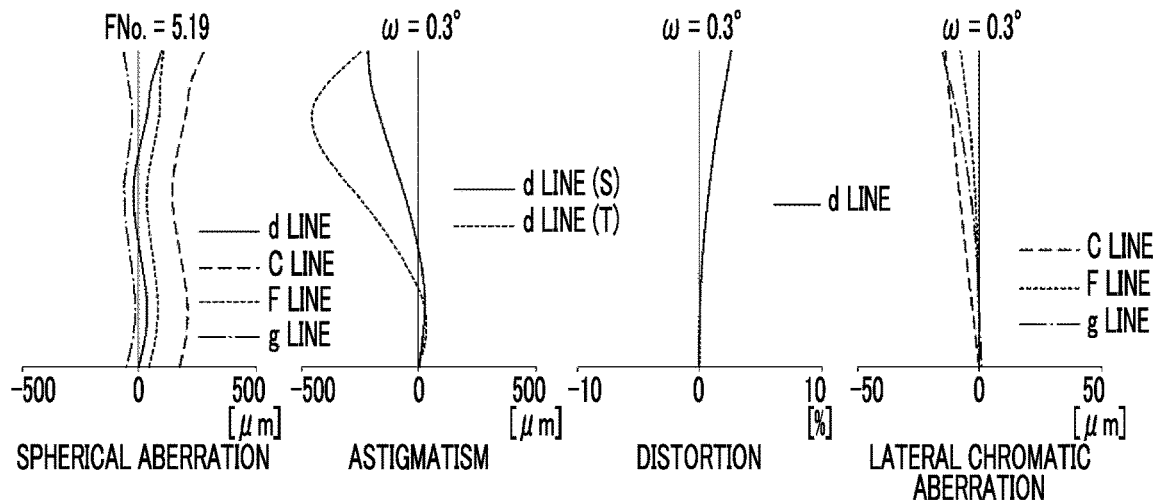

ZOOM LENS AND IMAGING APPARATUS

CROSS-REFERENCE TO RELATED APPLICATIONS

The present application claims priority under 35 U.S.C. § 119 to Japanese Patent Application No. 2019-171643, filed on Sep. 20, 2019. The above application is hereby expressly incorporated by reference, in its entirety, into the present application.

BACKGROUND OF THE INVENTION

1. Field of the Invention

The technology of the present disclosure relates to a zoom lens and an imaging apparatus.

2. Description of the Related Art

In the related art, a zoom lens consisting of a plurality of lens groups of which mutual intervals are changed during zooming has been suggested as a lens system usable in a broadcasting camera, a movie imaging camera, a digital camera, and the like.

For example, WO2017/170047A discloses a lens system substantially consisting of, in order from an object side to an image side, at least two moving lens groups that include a first lens group which has a positive refractive power and is fixed with respect to an image surface during zooming, and a second lens group which has a negative refractive power and is adjacent to the first lens group, and that are moved by changing an interval with an adjacent group during zooming, and a final lens group that is arranged closest to the image side and is fixed with respect to the image surface during zooming. JP2016-164629A discloses a lens system substantially consisting of, in order from an object side to an image side, a first lens group having a positive refractive power, a second lens group having a negative refractive power, a third lens group having a positive refractive power, a fourth lens group having a positive refractive power, and a fifth lens group having a positive refractive power, in which during zooming, the first lens group and the fifth lens group are fixed with respect to an image surface, and the second lens group, the third lens group, and the fourth lens group are moved by changing intervals therebetween.

SUMMARY OF THE INVENTION

One embodiment according to the technology of the present disclosure provides a zoom lens that achieves size reduction and a high magnification and has favorable optical characteristics while suppressing a change in aberration during zooming, and an imaging apparatus comprising the zoom lens.

A zoom lens according to one aspect of the technology of the present disclosure consists of, in order from an object side to an image side, a first lens group that has a positive refractive power and is fixed with respect to an image surface during zooming, a negative moving lens group that consists of one or two lens groups moved along an optical axis by changing an interval with an adjacent lens group during zooming, and has a negative refractive power as a whole at a wide angle end, a first positive moving lens group that has a positive refractive power and is moved along the optical axis during zooming, a second positive moving lens group that has a positive refractive power and is moved along the optical axis during zooming, and a subsequent lens group including a stop, in which all intervals between adjacent lens groups are changed during zooming, all lens groups included in the negative moving lens group are moved to the image side during zooming from the wide angle end to a telephoto end, the first positive moving lens group consists of a single lens that is a positive lens, and a cemented lens configured by cementing two lenses in which any one is a positive lens and the other is a negative lens, and in a state where an object at infinity is focused, in a case where a focal length of the first lens group is denoted by f1, a focal length of the negative moving lens group at the wide angle end is denoted by fNw, a focal length of the first positive moving lens group is denoted by fP1, and a focal length of the second positive moving lens group is denoted by fP2, Conditional Expressions (1) and (2) are satisfied.

$$-11.5 < f1/fNw < -8.5 \tag{1}$$

$$0.5 < fP2/fP1 < 1 \tag{2}$$

It is preferable that the zoom lens of the aspect further satisfies at least one of Conditional Expression (1-1) or (2-1).

$$-11 < f1/fNw < -9.5 \tag{1-1}$$

$$0.6 < fP2/fP1 < 0.9 \tag{2-1}$$

In a case where a d line-based Abbe number of the negative lens of the first positive moving lens group is denoted by $vn$, it is preferable to satisfy Conditional Expression (3) below, and it is more preferable to satisfy Conditional Expression (3-1) below.

$$20 < vn < 40 \tag{3}$$

$$25 < vn < 37 \tag{3-1}$$

In a case where a d line-based Abbe number of a positive lens of which the d line-based Abbe number is largest out of the positive lenses included in the first positive moving lens group is denoted by $vp$, and a partial dispersion ratio, between g line and F line, of the positive lens of which the d line-based Abbe number is largest out of the positive lenses included in the first positive moving lens group is denoted by $\theta p$, it is preferable to satisfy Conditional Expressions (4) and (5) below. In addition, after Conditional Expressions (4) and (5) below are satisfied, it is more preferable to satisfy at least one of Conditional Expression (4-1) or (5-1).

$$80 < vp \tag{4}$$

$$0.66 < \theta p + 0.001625 \times vp < 0.72 \tag{5}$$

$$90 < vp < 105 \tag{4-1}$$

$$0.67 < \theta p + 0.001625 \times vp < 0.7 \tag{5-1}$$

In a state where an object at infinity is focused, in a case where a focal length of the negative lens of the first positive moving lens group is denoted by $fn$, and the focal length of the first positive moving lens group is denoted by fP1, it is preferable to satisfy Conditional Expression (6) below, and it is more preferable to satisfy Conditional Expression (6-1) below.

$$-4 < fn/fP1 < -1 \tag{6}$$

$$-3.5 < fn/fP1 < -1.2 \tag{6-1}$$

In a configuration satisfying Conditional Expression (6) above, in a case where a refractive index of the negative lens of the first positive moving lens group with respect to d line is denoted by Ndn, it is preferable to satisfy Conditional Expression (7) below, and it is more preferable to satisfy Conditional Expression (7-1) below.

$$1.55 < Ndn < 1.77 \quad (7)$$

$$1.57 < Ndn < 1.7 \quad (7-1)$$

It is preferable that the second positive moving lens group at the telephoto end is positioned on the object side from the second positive moving lens group at the wide angle end, and in a state where an object at infinity is focused, an interval between the first positive moving lens group and the second positive moving lens group is largest on a wide angle side from a zoom position at which a lateral magnification of a combined lens group obtained by combining the first positive moving lens group and the second positive moving lens group is −1.

In a state where an object at infinity is focused, during zooming from the wide angle end to the telephoto end, it is preferable that a combined lens group obtained by combining the first positive moving lens group and the second positive moving lens group, and the negative moving lens group simultaneously pass through respective points at which lateral magnifications are −1.

The negative moving lens group may be configured to consist of one lens group having a negative refractive power. Alternatively, the negative moving lens group may be configured to consist of one lens group having a negative refractive power and one lens group having a positive refractive power in order from the object side to the image side.

It is preferable that the first lens group comprises at least one lens that is moved along the optical axis during focusing.

An imaging apparatus according to another aspect of the technology of the present disclosure comprises the zoom lens of the aspect of the present disclosure.

In the present specification, "consist of" or "consisting of" means that a lens that substantially does not have a refractive power, and optical elements such as a stop, a filter, and a cover glass other than a lens, mechanism parts such as a lens flange, a lens barrel, an imaging element, and a camera shake correction mechanism, and the like may be included besides illustrated constituents.

In the present specification, a "~group having a positive refractive power" means that the entire group has a positive refractive power. Similarly, a "~group having a negative refractive power" means that the entire group has a negative refractive power. A "lens having a positive refractive power" and a "positive lens" have the same meaning. A "lens having a negative refractive power" and a "negative lens" have the same meaning. A "~lens group" is not limited to a configuration consisting of a plurality of lenses and may be configured to consist of only one lens. As "one lens group", a lens group included in one section in a case where a lens group is divided into sections at intervals that are changed during zooming is set as one lens group.

A compound aspherical lens (a lens in which a spherical lens and a film of an aspherical shape formed on the spherical lens are configured as a single unit and function as one aspherical lens as a whole) is not regarded as a cemented lens and is handled as one lens. The sign of a refractive power and a surface shape related to a lens including an aspherical surface are considered in a paraxial region unless otherwise specified.

The "focal length" used in the conditional expressions is a paraxial focal length. The values used in the conditional expressions except the partial dispersion ratio are values in a case based on d line in a state where the object at infinity is focused. A partial dispersion ratio θgF of a certain lens between g line and F line is defined as θgF=(Ng−NF)/(NF−NC) in a case where the refractive indexes of the lens with respect to g line, F line, and C line are denoted by Ng, NF, and NC, respectively. In the present specification, "d line", "C line", "F line", and "g line" are bright lines. The wavelength of d line is 587.56 nanometers (nm). The wavelength of C line is 656.27 nanometers (nm). The wavelength of F line is 486.13 nanometers (nm). The wavelength of g line is 435.84 nanometers (nm).

BRIEF DESCRIPTION OF THE DRAWINGS

FIG. 2 is a cross-sectional view illustrating a configuration of the zoom lens and luminous flux illustrated in FIG. 1.

FIG. 3 is each aberration diagram of the zoom lens of Example 1 of the present disclosure.

FIG. 5 is each aberration diagram of the zoom lens of Example 2 of the present disclosure.

FIG. 7 is a cross-sectional view illustrating the configuration and luminous flux of the zoom lens illustrated in FIG. 6.

FIG. 8 is each aberration diagram of the zoom lens of Example 3 of the present disclosure.

FIG. 10 is each aberration diagram of the zoom lens of Example 4 of the present disclosure.

FIG. 12 is each aberration diagram of the zoom lens of Example 5 of the present disclosure.

DESCRIPTION OF THE PREFERRED EMBODIMENTS

Figure 1:
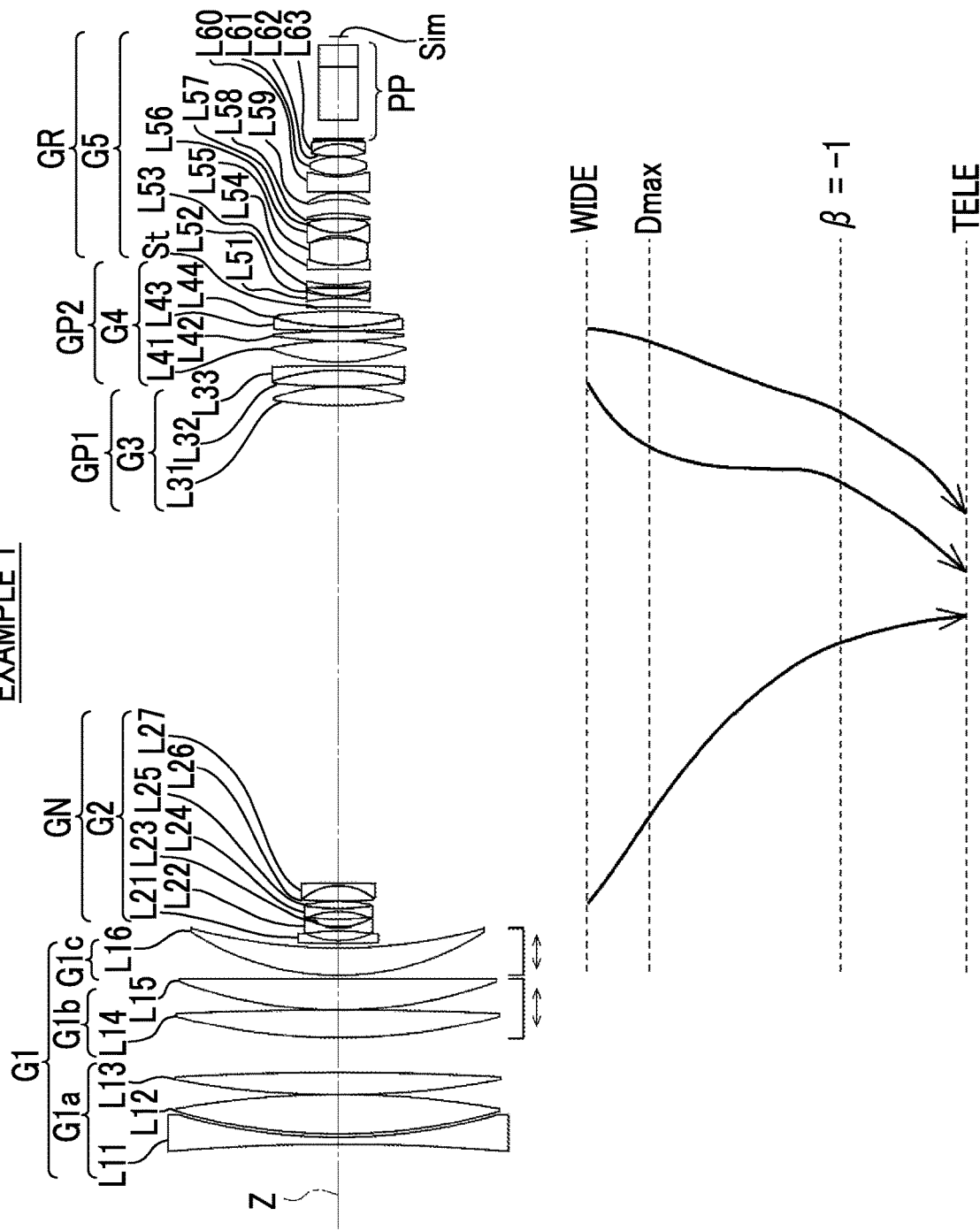
FIG. 1 is a diagram corresponding to a zoom lens of Example 1 of the present disclosure and illustrating a cross-sectional view of a configuration and a movement trajectory of a zoom lens according to one embodiment of the present disclosure.

Hereinafter, one example of an embodiment according to the technology of the present disclosure will be described with reference to the drawings. FIG. 1 illustrates a cross-sectional view of a configuration and a movement trajectory at a wide angle end of a zoom lens according to one embodiment of the present disclosure. FIG. 2 is a cross-sectional view illustrating the configuration of the zoom lens and luminous flux. Examples illustrated in FIG. 1 and FIG. 2 correspond to a zoom lens of Example 1 described later. In the cross-sectional views of FIG. 1 and FIG. 2, a state where an object at infinity is focused is illustrated. A left side is an object side, and a right side is an image side. In FIG. 2, a wide angle end state is illustrated in an upper part denoted by "WIDE", a middle focal length state is illustrated in a middle part denoted by "MIDDLE", and a telephoto end state is illustrated in a lower part denoted by "TELE". The "middle" in the "middle focal length" does not necessarily mean a center point between the wide angle end and a telephoto end, and the middle focal length is between the wide angle end and the telephoto end. In FIG. 2, axial luminous flux wa and luminous flux wb of the maximum angle of view in the wide angle end state, axial luminous flux ma and luminous flux mb of the maximum angle of view in the middle focal length state, and axial luminous flux ta and luminous flux tb of the maximum angle of view in the telephoto end state are illustrated as luminous flux. Hereinafter, the zoom lens according to one embodiment of the present disclosure will be described mainly with reference to FIG. 1.

In FIG. 1, an example in which an optical member PP in which an incidence surface and an emission surface are parallel is arranged between the zoom lens and an image surface Sim is illustrated by assuming application of the zoom lens to an imaging apparatus. The optical member PP is a member that is assumed to correspond to various filters, a cover glass, a prism, and the like. For example, the various filters include a low-pass filter, an infrared cut filter, and a filter cutting a specific wavelength range. The optical member PP is a member not having a refractive power, and the optical member PP can be configured not to be included.

The zoom lens consists of, in order from the object side to the image side along an optical axis Z, a first lens group G1 having a positive refractive power, a negative moving lens group GN, a first positive moving lens group GP1 having a positive refractive power, a second positive moving lens group GP2 having a positive refractive power, and a subsequent lens group GR including aperture stop St. The negative moving lens group GN consists of one or two lens groups that are moved along the optical axis Z by changing an interval with an adjacent lens group during zooming, and has a negative refractive power as a whole at the wide angle end. During zooming, the first lens group G1 is fixed with respect to the image surface Sim. The one or two lens groups constituting the negative moving lens group GN, the first positive moving lens group GP1, and the second positive moving lens group GP2 are moved along the optical axis Z, and all intervals between the adjacent lens groups are changed. By having the above configuration that includes at least five lens groups between which the intervals are changed during zooming, and in which a lens group having a positive refractive power is arranged closest to the object side, both a high magnification and reduction of a total length are easily achieved. In addition, since achromatization can be performed by the first positive moving lens group GP1 and the second positive moving lens group Gp2 having a positive refractive power, an advantage of suppressing a change in axial chromatic aberration on a telephoto side during zooming is achieved.

The zoom lens in the example illustrated in FIG. 1 consists of, in order from the object side to the image side, the first lens group G1, a second lens group G2, a third lens group G3, a fourth lens group G4, and a fifth lens group G5. In this example, the negative moving lens group GN consists of one lens group, and the second lens group G2 corresponds to the negative moving lens group GN. The third lens group G3 corresponds to the first positive moving lens group GP1. The fourth lens group G4 corresponds to the second positive moving lens group GP2. The fifth lens group G5 corresponds to the subsequent lens group GR. In this example, the subsequent lens group GR is fixed with respect to the image surface Sim during zooming. In FIG. 1, the movement trajectory of each lens group during zooming from the wide angle end to the telephoto end is schematically illustrated by a solid arrow below each of the second lens group G2, the third lens group G3, and the fourth lens group G4. In addition, in FIG. 1, the wide angle end and the telephoto end corresponding to the starting point and the ending point of the movement trajectory, respectively, are denoted by "WIDE" and "TELE", respectively.

Each lens group in the example in FIG. 1 is composed of lenses described below. That is, the first lens group G1 consists of six lenses of lenses L11 to L16 in order from the object side to the image side. The second lens group G2 consists of seven lenses of lenses L21 to L27 in order from the object side to the image side. The third lens group G3 consists of three lenses of lenses L31 to L33 in order from the object side to the image side. The fourth lens group G4 consists of four lenses of lenses L41 to L44 in order from the object side to the image side. The fifth lens group G5 consists of an aperture stop St and 13 lenses of lenses L51 to L63 in order from the object side to the image side. The aperture stop St in FIG. 1 does not illustrate a shape and illustrates a position in an optical axis direction.

During zooming from the wide angle end to the telephoto end, all lens groups included in the negative moving lens group GN are configured to be moved to the image side. According to such a configuration, the negative moving lens group GN can bear a main zooming effect. Thus, an advantage of a high magnification is achieved.

The first positive moving lens group GP1 consists of a single lens that is a positive lens, and a cemented lens configured by cementing two lenses in which any one is a positive lens and the other is a negative lens. The cemented lens configured by cementing two lenses in which any one is a positive lens and the other is a negative lens may be obtained by cementing the positive lens and the negative lens in order from the object side or by cementing the negative lens and the positive lens in order from the object side. In the first positive moving lens group GP1, the single lens and the cemented lens may be arranged in order from the object side to the image side, or the cemented lens and the single lens may be arranged in order from the object side to the image side. By including the cemented lens in the first positive moving lens group GP1, a change in axial chromatic aberration during zooming can be favorably suppressed. In addition, by having the above configuration in which the first positive moving lens group GP1 consists of three lenses, a zoom stroke (movement range during zooming) can be secured by saving space compared to a configuration consisting of four or more lenses. Thus, both a high magnification and reduction of the total length are easily achieved.

In a state where the object at infinity is focused, in a case where the focal length of the first lens group G1 is denoted by f1 and the focal length of the negative moving lens group GN at the wide angle end is denoted by fNw, the zoom lens is configured to satisfy Conditional Expression (1) below. By satisfying Conditional Expression (1) not to be below the lower limit thereof, the refractive power of the first lens group G1 is not excessively decreased. Thus, the first lens group G1 can form an image point closer to the object side. Generally, the zoom stroke of the negative moving lens group GN is set to be within a range from the surface of the first lens group G1 closest to the image side to the image point formed by the first lens group G1. Thus, by satisfying Conditional Expression (1) not to be below the lower limit thereof, an increase in zoom stroke of the negative moving lens group GN can be suppressed. Accordingly, both a high magnification and size reduction are easily achieved. Alternatively, by satisfying Conditional Expression (1) not to be below the lower limit thereof, the refractive power of the negative moving lens group GN is not excessively increased. Thus, a change in aberration during zooming is easily suppressed. By satisfying Conditional Expression (1) not to be above the upper limit thereof, the refractive power of the first lens group G1 is not excessively increased. Thus, since the first lens group G1 can form the image point closer to the image side, the zoom stroke of the negative moving lens group GN is not excessively reduced. Accordingly, since rays can be smoothly curved, both a high magnification and high characteristics are easily achieved. Alternatively, by satisfying Conditional Expression (1) not to be above the upper limit thereof, the refractive power of the negative moving lens group GN is not excessively decreased. Thus, both a high magnification and size reduction are easily achieved. Furthermore, in a case where it is configured to satisfy Conditional Expression (1-1) below, more favorable characteristics can be achieved.

$$-11.5 < f1/fNw < -8.5 \tag{1}$$

$$-11 < f1/fNw < -9.5 \tag{1-1}$$

In a state where the object at infinity is focused, in a case where the focal length of the first positive moving lens group GP1 is denoted by fP1 and the focal length of the second positive moving lens group GP2 is denoted by fP2, the zoom lens is configured to satisfy Conditional Expression (2) below. By satisfying Conditional Expression (2) not to be below the lower limit thereof, the refractive power of the first positive moving lens group GP1 is not excessively decreased with respect to the second positive moving lens group GP2. Thus, the diameter of the lens of the second positive moving lens group GP2 is easily decreased, and an increase in zoom stroke of the first positive moving lens group GP1 can be suppressed. Accordingly, both a high magnification and size reduction are easily achieved. By satisfying Conditional Expression (2) not to be above the upper limit thereof, the refractive power of the first positive moving lens group GP1 is not excessively increased with respect to the second positive moving lens group GP2. Thus, since a change in aberration during zooming is easily suppressed, both a high magnification and high characteristics are easily achieved. Furthermore, in a case where it is configured to satisfy Conditional Expression (2-1) below, more favorable characteristics can be achieved.

$$0.5 < fP2/fP1 < 1 \tag{2}$$

$$0.6 < fP2/fP1 < 0.9 \tag{2-1}$$

Like the zoom lens according to the embodiment of the present disclosure, in a lens system of a type consisting of, in order from the object side to the image side, the first lens group G1 having a positive refractive power, three or more moving lens groups that are moved by changing intervals between adjacent lens groups during zooming, and the subsequent lens group GR including the aperture stop St, appropriate refractive power arrangement of the moving lens groups is important for achieving both size reduction and a high magnification. In a case where a high magnification is achieved, a change in axial chromatic aberration during zooming is likely to be increased. Thus, it is important to set a configuration for correcting chromatic aberration of the moving lens groups. By having the above group configuration and satisfying Conditional Expressions (1) and (2), the zoom lens according to the embodiment of the technology of the present disclosure achieves size reduction, a high magnification, and high characteristics and easily suppresses a change in aberration during zooming.

Furthermore, in a case where the d line-based Abbe number of the negative lens of the first positive moving lens group GP1 is denoted by νn, it is preferable to satisfy Conditional Expression (3) below in order to suppress the chromatic aberration. By satisfying Conditional Expression (3) not to be below the lower limit thereof, excessive correction of the axial chromatic aberration is suppressed, and a change in chromatic aberration during zooming is easily favorably suppressed. By satisfying Conditional Expression (3) not to be above the upper limit thereof, insufficient correction of the axial chromatic aberration is suppressed, and a change in chromatic aberration during zooming is easily favorably suppressed. Furthermore, in a case where it is configured to satisfy Conditional Expression (3-1) below, more favorable characteristics can be achieved.

$$20 < νn < 40 \tag{3}$$

$$25 < νn < 37 \tag{3-1}$$

In a case where the d line-based Abbe number of the positive lens having the highest d line-based Abbe number of the positive lenses included in the first positive moving lens group GP1 is denoted by νp, it is preferable to satisfy Conditional Expression (4) below. By satisfying Conditional Expression (4) not to be below the lower limit thereof, insufficient correction of the axial chromatic aberration is suppressed, and a change in chromatic aberration during zooming is easily favorably suppressed. Furthermore, it is more preferable that the zoom lens satisfies Conditional Expression (4-1) below. By satisfying Conditional Expression (4-1) not to be below the lower limit thereof, insufficient correction of the axial chromatic aberration is more favorably suppressed, and a change in chromatic aberration during zooming is easily favorably suppressed. By satisfying Conditional Expression (4-1) not to be above the upper limit thereof, excessive correction of the axial chromatic aberration is suppressed, and a change in chromatic aberration during zooming is easily favorably suppressed.

$$80 < νp \tag{4}$$

$$90 < νp < 105 \tag{4-1}$$

In a case where the d line-based Abbe number of the positive lens having the highest d line-based Abbe number of the positive lenses included in the first positive moving lens group GP1 is denoted by νp and the partial dispersion ratio, between g line and F line, of the positive lens having the highest d line-based Abbe number of the positive lenses included in the first positive moving lens group GP1 is denoted by θp, it is preferable to satisfy Conditional Expression (5) below. By satisfying Conditional Expression (5), second-order axial chromatic aberration is easily favorably corrected over the entire zoom range. Furthermore, in a case where it is configured to satisfy Conditional Expression (5-1) below, more favorable characteristics can be achieved.

$$0.66 < θp + 0.001625 \times νp < 0.72 \tag{5}$$

$$0.67 < θp + 0.001625 \times νp < 0.7 \tag{5-1}$$

It is preferable to satisfy Conditional Expressions (4) and (5) for favorable correction of the chromatic aberration. Furthermore, after Conditional Expressions (4) and (5) are satisfied, it is more preferable to satisfy at least one of Conditional Expression (4-1) or (5-1).

In a state where the object at infinity is focused, in a case where the focal length of the negative lens of the first positive moving lens group GP1 is denoted by fn and the focal length of the first positive moving lens group GP1 is denoted by fP1, it is preferable that the zoom lens satisfies Conditional Expression (6) below. By satisfying Conditional Expression (6) not to be below the lower limit thereof, the refractive power of the negative lens of the first positive moving lens group GP1 is not excessively decreased. Thus, insufficient correction of the axial chromatic aberration is suppressed, and a change in chromatic aberration during zooming is easily favorably suppressed. By satisfying Conditional Expression (6) not to be above the upper limit thereof, the refractive power of the negative lens of the first positive moving lens group GP1 is not excessively increased. Thus, excessive correction of the axial chromatic aberration is suppressed, and a change in chromatic aberration during zooming is easily favorably suppressed. Furthermore, in a case where it is configured to satisfy Conditional Expression (6-1) below, more favorable characteristics can be achieved.

$$-4 < fn/fP1 < -1 \quad (6)$$

$$-3.5 < fn/fP1 < -1.2 \quad (6\text{-}1)$$

In a configuration satisfying Conditional Expression (6), in a case where the refractive index of the negative lens of the first positive moving lens group GP1 with respect to d line is denoted by Ndn, it is preferable to satisfy Conditional Expression (7) below. By satisfying Conditional Expression (7) not to be below the lower limit thereof, a tendency for an excessive field curvature can be suppressed. Thus, a refractive power distribution for the negative lens of the first positive moving lens group GP1 for achieving both the configuration satisfying Conditional Expression (6) and favorable correction of the field curvature can be suitably set. By satisfying Conditional Expression (7) not to be above the upper limit thereof, a tendency for a positive Petzval sum can be suppressed. Thus, the refractive power distribution for the negative lens of the first positive moving lens group GP1 for achieving both the configuration satisfying Conditional Expression (6) and favorable correction of the field curvature can be suitably set. Furthermore, in a case where it is configured to satisfy Conditional Expression (7-1) below, more favorable characteristics can be achieved.

$$1.55 < Ndn < 1.77 \quad (7)$$

$$1.57 < Ndn < 1.7 \quad (7\text{-}1)$$

During zooming from the wide angle end to the telephoto end in a state where the object at infinity is focused, it is preferable that a combined lens group obtained by combining the first positive moving lens group GP1 and the second positive moving lens group GP2, and the negative moving lens group GN simultaneously pass through respective points at which lateral magnifications are -1. In such a case, a high magnification is easily achieved. In the drawing of the movement trajectory in FIG. 1, a zoom position at which the lateral magnification of the combined lens group and the lateral magnification of the negative moving lens group GN are -1 is indicated by "β=-1".

It is preferable that the second positive moving lens group GP2 at the telephoto end is positioned on the object side from the second positive moving lens group GP2 at the wide angle end. Furthermore, in a state where the object at infinity is focused, it is preferable to configure that the interval between the first positive moving lens group GP1 and the second positive moving lens group GP2 is largest on the wide angle side from the zoom position at which the lateral magnification of the combined lens group obtained by combining the first positive moving lens group GP1 and the second positive moving lens group GP2 is -1. In the drawing of the movement trajectory in FIG. 1, a zoom position at which the interval between the first positive moving lens group GP1 and the second positive moving lens group GP2 is largest is denoted by "Dmax". In the lens system such as the zoom lens according to the embodiment of the present disclosure, the amount of outer edge rays of non-axial luminous flux is largest on the wide angle side from the zoom position at which the lateral magnification of the combined lens group is -1. A state where the interval between the first positive moving lens group GP1 and the second positive moving lens group GP2 is largest is a state where the first positive moving lens group GP1 is extended to the object side. By having the configuration in which the interval between the first positive moving lens group GP1 and the second positive moving lens group GP2 is largest within a zoom range between the wide angle end and the zoom position at which the lateral magnification of the combined lens group is -1, the first positive moving lens group GP1 having a positive refractive power can be extended to the object side at or near the zoom position at which the amount of outer edge rays of the non-axial luminous flux is largest. Accordingly, since the outer edge rays of the non-axial luminous flux in the first lens group G1 can be further reduced, an increase in diameter of the first lens group G1 can be suppressed, and an advantage of size reduction is achieved.

A focusing operation may be configured to be performed by moving at least one lens of the first lens group G1 along the optical axis Z. In a case where the first lens group G1 comprises a lens group (hereinafter, referred to as the focus lens group) that is moved during focusing, the advancing amount of the focus lens group during focusing at the telephoto end can be suppressed. Thus, the minimum subject distance can be decreased. In addition, since the advancing amount of the focus lens group during focusing can be constant over the entire zoom range, a mechanism can be simplified.

The first lens group G1 in the example in FIG. 1 comprises two focus lens groups. More specifically, the first lens group G1 in the example in FIG. 1 consists of, in order from the object side to the image side, a first a lens group G1a that is fixed with respect to the image surface Sim during focusing, a first b lens group G1b that is moved along the optical axis Z during focusing, and the first c lens group G1c that is moved along the optical axis Z by changing a mutual interval with the first b lens group G1b during focusing. A horizontal bidirectional arrow shown below each of the first b lens group G1b and the first c lens group G1c in FIG. 1 indicates that each of the first b lens group G1b and the first c lens group G1c is the focus lens group.

The example illustrated in FIG. 1 is one example and can be subjected to various modifications. For example, the number of lenses constituting each lens group other than the first positive moving lens group GP1 can be a number different from the example illustrated in FIG. 1.

While the negative moving lens group GN in the example in FIG. 1 consists of one lens group, the negative moving lens group GN may be configured to consist of two lens groups between which a mutual interval is changed during zooming. In a case where the negative moving lens group GN consists of one lens group having a negative refractive power, a structure related to moving groups can be further simplified. Thus, an advantage of reducing overall manufacturing error and reducing the cost of components is achieved. In a case where the negative moving lens group GN consists of, in order from the object side to the image side, one lens group having a negative refractive power and one lens group having a positive refractive power, a change in aberration during zooming is easily suppressed.

While the subsequent lens group GR in the example in FIG. 1 is fixed with respect to the image surface during zooming, the subsequent lens group GR may be configured to be moved during zooming. In the configuration in which the subsequent lens group GR is fixed with respect to the image surface during zooming, the distance from the lens surface closest to the object side to the lens surface closest to the image side is not changed during zooming, and a change in centroid of the lens system can be reduced. Thus, convenience of use during imaging can be increased. In the configuration in which the subsequent lens group GR is moved during zooming, an advantage of suppressing a change in aberration during zooming is achieved.

The above preferred configurations and available configurations can be randomly combined and preferably, are appropriately selectively employed depending on required specifications. According to the technology of the present disclosure, a zoom lens that achieves size reduction and a high magnification and has favorable optical characteristics while suppressing a change in aberration during zooming can be implemented. The "high magnification" here means that a zoom magnification is greater than or equal to a power of 100.

Next, examples of the numerical value of the zoom lens according to the embodiment of the present disclosure will be described.

Example 1

A configuration and a movement trajectory of the zoom lens of Example 1 are illustrated in FIG. 1, and the illustration method and the configuration thereof are described above. Thus, a duplicate description will be partially omitted here. The zoom lens of Example 1 consists of, in order from the object side to the image side, the first lens group G1 having a positive refractive power, the second lens group G2 having a negative refractive power, the third lens group G3 having a positive refractive power, the fourth lens group G4 having a positive refractive power, and the fifth lens group G5 having a positive refractive power. During zooming, the first lens group G1 and the fifth lens group G5 are fixed with respect to the image surface Sim, and the second lens group G2, the third lens group G3, and the fourth lens group G4 are moved along the optical axis Z by changing the intervals between the adjacent lens groups. The second lens group G2 corresponds to the negative moving lens group GN. The third lens group G3 corresponds to the first positive moving lens group GP1. The fourth lens group G4 corresponds to the second positive moving lens group GP2. The fifth lens group G5 corresponds to the subsequent lens group GR. The first lens group G1 consists of the first a lens group G1a, the first b lens group G1b, and the first c lens group G1c in order from the object side to the image side. During focusing from the object at infinity to an object in a short range, the first b lens group G1b and the first c lens group G1c are moved to the object side by changing a mutual interval, and all of the other lens groups are fixed with respect to the image surface Sim. The first a lens group G1a consists of three lenses of the lenses L11 to L13 in order from the object side to the image side. The first b lens group G1b consists of two lenses of the lenses L14 and L15 in order from the object side to the image side. The first c lens group G1c consists of one lens of the lens L16. The second lens group G2 consists of seven lenses of the lenses L21 to L27 in order from the object side to the image side. The third lens group G3 consists of three lenses of the lenses L31 to L33 in order from the object side to the image side. The fourth lens group G4 consists of four lenses of the lenses L41 to L44 in order from the object side to the image side. The fifth lens group G5 consists of the aperture stop St and 13 lenses of the lenses L51 to L63 in order from the object side to the image side. Above is the summary of the zoom lens of Example 1.

For the zoom lens of Example 1, fundamental lens data is shown in Table 1A and Table B, specifications and variable surface intervals are shown in Table 2, and aspherical coefficients are shown in Table 3. The fundamental lens data is separately displayed in two tables of Table 1A and Table 1B in order to avoid one long table. Table 1A shows the first lens group G1 to the fourth lens group G4, and Table 1B shows the fifth lens group G5 and the optical member PP. Table 1A, Table 1B, and Table 2 show data in a state where the object at infinity is focused.

In Table 1A and Table 1B, the field of Sn shows a surface number in a case where the surface closest to the object side is set as a first surface and the number is increased by one at a time toward the image side. The field of R shows the radius of curvature of each surface. The field of D shows a surface interval on the optical axis between each surface and a surface adjacent thereto on the image side. The field of Nd shows the refractive index of each constituent with respect to d line. The field of vd shows the d line-based Abbe number of each constituent. The field of θgF shows the partial dispersion ratio of each constituent between g line and F line.

In Table 1A and Table 1B, the sign of the radius of curvature of a surface having a shape of a convex surface toward the object side is positive, and the sign of the radius of curvature of a surface having a shape of a convex surface toward the image side is negative. In Table 1B, the aperture stop St and the optical member PP are also shown together. In Table 1B, the surface number and a word (St) are written in the field of the surface number of the surface corresponding to the aperture stop St. In Table 1A and Table 1B, a symbol DD[ ] is used for the variable surface interval during zooming. The variable surface interval is shown in the field of D by adding the surface number on the object side of the interval in [ ].

Table 2 shows a zoom magnification Zr, a focal length f, a back focus Bf converted to a distance in air, an F number FNo., a maximum total angle of view 2ω, and the variable surface interval during zooming based on d line. In the field of 2ω, (°) means that the unit is degree. In Table 2, values in the wide angle end state, the middle focal length state, and the telephoto end state are shown in the fields marked with WIDE, MIDDLE, and TELE, respectively.

In the fundamental lens data, the surface number of an aspherical surface is marked with *, and the numerical value of a paraxial radius of curvature is written in the field of the radius of curvature of the aspherical surface. In Table 3, the field of Sn shows the surface number of the aspherical surface, and the fields of KA and Am (m=3, 4, 5, . . . 16) show the numerical value of the aspherical coefficient for each aspherical surface. In the numerical value of the aspherical coefficient in Table 3, "E±n" (n: integer) means "×10±n". KA and Am are aspherical coefficients in an aspherical expression represented by the following expression.

$$Zd = C \times h^2 / \{1 + (1 - KA \times C^2 \times h^2)^{1/2}\} + \Sigma Am \times h^m$$

where

Zd: aspherical depth (length of a perpendicular line drawn from a point on the aspherical surface having a height h to a plane that is in contact with an aspherical vertex and is perpendicular to the optical axis)

h: height (distance from the optical axis to the lens surface)

C: reciprocal of paraxial radius of curvature

KA and Am: aspherical coefficients

In the aspherical expression, Σ means the total sum related to m.

In the data of each table, degree is used as the unit of angle, and mm (millimeter) is used as the unit of length. However, since the optical system can be used even in a case where propositional enlargement or propositional reduction is performed, other appropriate units can also be used. In addition, numerical values that are rounded to a predetermined number of digits are written in each table shown below.

TABLE 1A

Example 1

| Sn | R | D | Nd | vd | θgF |
|---|---|---|---|---|---|
| 1 | −1314.44736 | 4.400 | 1.83481 | 42.73 | 0.56481 |
| 2 | 375.22212 | 2.000 | | | |
| 3 | 380.98802 | 24.220 | 1.43387 | 95.18 | 0.53733 |
| 4 | −619.18405 | 0.120 | | | |
| 5 | 584.09992 | 13.630 | 1.43387 | 95.18 | 0.53733 |
| 6 | −1937.22858 | 21.520 | | | |
| 7 | 396.43760 | 17.340 | 1.43387 | 95.18 | 0.53733 |
| 8 | −2314.51657 | 0.120 | | | |
| 9 | 295.16013 | 19.200 | 1.43700 | 95.10 | 0.53364 |
| 10 | ∞ | 2.160 | | | |
| 11 | 172.64422 | 16.940 | 1.43700 | 95.10 | 0.53364 |
| 12 | 358.69766 | DD[12] | | | |
| *13 | 935.98696 | 1.800 | 1.90366 | 31.31 | 0.59481 |
| 14 | 50.73223 | 6.010 | | | |
| 15 | −135.10191 | 1.800 | 1.87070 | 40.73 | 0.56825 |
| 16 | 40.80800 | 4.960 | 1.43700 | 95.10 | 0.53364 |
| 17 | 150.59356 | 4.690 | | | |
| 18 | −53.04330 | 1.800 | 1.89800 | 34.00 | 0.58703 |
| 19 | 136.79400 | 4.720 | 1.89286 | 20.36 | 0.63944 |
| 20 | −96.87418 | 0.140 | | | |
| 21 | 440.21414 | 9.390 | 1.80518 | 25.45 | 0.61571 |
| 22 | −34.56000 | 1.820 | 1.80400 | 46.53 | 0.55775 |
| 23 | −572.90804 | DD[23] | | | |
| 24 | 246.87583 | 11.640 | 1.49700 | 81.54 | 0.53748 |
| *25 | −123.60927 | 0.120 | | | |
| 26 | 416.68258 | 10.110 | 1.43700 | 95.10 | 0.53364 |
| 27 | −127.84400 | 2.520 | 1.59270 | 35.27 | 0.59363 |
| 28 | −1862.36878 | DD[28] | | | |
| 29 | 120.01989 | 12.810 | 1.43700 | 95.10 | 0.53364 |
| 30 | −225.91503 | 0.120 | | | |
| *31 | 239.27475 | 6.170 | 1.43700 | 95.10 | 0.53364 |
| 32 | −432.65553 | 0.230 | | | |
| 33 | 884.55488 | 2.410 | 1.85883 | 30.00 | 0.59793 |
| 34 | 162.55600 | 9.050 | 1.43700 | 95.10 | 0.53364 |
| 35 | −316.46190 | DD[35] | | | |

TABLE 1B

Example 1

| Sn | R | D | Nd | vd | θgF |
|---|---|---|---|---|---|
| 36 (St) | ∞ | 5.740 | | | |

TABLE 1B-continued

Example 1

| Sn | R | D | Nd | vd | θgF |
|---|---|---|---|---|---|
| 37 | −109.60235 | 1.300 | 1.80100 | 34.97 | 0.58642 |
| 38 | 82.29280 | 0.120 | | | |
| 39 | 49.51289 | 4.610 | 1.84666 | 23.78 | 0.61923 |
| 40 | 354.30763 | 0.860 | | | |
| 41 | −531.15341 | 1.300 | 1.64000 | 60.08 | 0.53704 |
| 42 | 82.11128 | 9.770 | | | |
| 43 | −446.16003 | 2.450 | 1.80100 | 34.97 | 0.58642 |
| 44 | 49.37100 | 16.950 | 1.80518 | 25.43 | 0.61027 |
| 45 | −59.80055 | 1.650 | | | |
| 46 | −37.24000 | 1.800 | 1.77250 | 49.60 | 0.55212 |
| 47 | 37.24000 | 8.700 | 1.53172 | 48.84 | 0.56309 |
| 48 | −74.93557 | 0.120 | | | |
| 49 | −195.94504 | 3.160 | 1.56732 | 42.82 | 0.57309 |
| 50 | −78.43840 | 8.510 | | | |
| 51 | −59.29837 | 4.280 | 1.54814 | 45.78 | 0.56859 |
| 52 | −33.89154 | 0.580 | | | |
| 53 | −925.12829 | 9.190 | 2.00069 | 25.46 | 0.61364 |
| 54 | 53.62076 | 1.220 | | | |
| 55 | 40.81294 | 11.260 | 1.53172 | 48.84 | 0.56309 |
| 56 | −40.81294 | 0.120 | | | |
| 57 | 78.01863 | 7.680 | 1.59551 | 39.24 | 0.58043 |
| 58 | −30.20900 | 2.100 | 2.00069 | 25.46 | 0.61364 |
| 59 | −150.40026 | 0.250 | | | |
| 60 | ∞ | 1.000 | 1.51633 | 64.14 | 0.53531 |
| 61 | ∞ | 11.372 | | | |
| 62 | ∞ | 33.000 | 1.60859 | 46.44 | 0.56664 |
| 63 | ∞ | 13.200 | 1.51633 | 64.05 | 0.53463 |
| 64 | ∞ | 5.510 | | | |

TABLE 2

Example 1

| | WIDE | MIDDLE | TELE |
|---|---|---|---|
| Zr | 1.0 | 21.6 | 120.6 |
| f | 8.291 | 179.225 | 1000.085 |
| Bf | 47.012 | 47.012 | 47.012 |
| FNo. | 1.76 | 1.76 | 5.17 |
| 2ω (°) | 69.8 | 3.4 | 0.6 |
| DD[12] | 2.723 | 160.691 | 179.393 |
| DD[23] | 295.478 | 79.686 | 2.937 |
| DD[28] | 2.496 | 12.006 | 4.223 |
| DD[35] | 2.318 | 50.632 | 116.462 |

TABLE 3

Example 1

| Sn | 13 | 25 | 31 |
|---|---|---|---|
| KA | 1.0000000E+00 | 1.0000000E+00 | 1.0000000E+00 |
| A3 | 3.3484999E−07 | 1.4341034E−09 | −2.4837372E−09 |
| A4 | 3.4708539E−07 | 1.0726671E−07 | −2.3796633E−07 |
| A5 | 1.7815640E−07 | −5.4598300E−09 | −1.1625905E−08 |
| A6 | −4.5054058E−08 | 4.5446725E−11 | 1.0618218E−09 |
| A7 | 6.7040497E−09 | −1.1808220E−11 | −3.9021456E−11 |
| A8 | −5.9737791E−10 | 7.9933403E−14 | 3.6579030E−13 |
| A9 | 3.4501013E−11 | −9.1511307E−15 | 2.2388337E−15 |
| A10 | −1.7034215E−12 | 3.7107919E−16 | 2.8939265E−16 |
| A11 | 9.6957627E−14 | 5.5308506E−18 | −5.6245445E−18 |
| A12 | −4.4624137E−15 | −2.9574739E−19 | −1.6931128E−19 |
| A13 | 8.3632689E−17 | −2.3635232E−21 | 2.2430720E−21 |
| A14 | 2.0291266E−18 | 1.2147121E−22 | 5.3204136E−23 |
| A15 | −1.1813140E−19 | 3.7765063E−25 | −3.5010780E−25 |
| A16 | 1.5090915E−21 | −1.9548099E−26 | −6.9906878E−27 |

FIG. 3 illustrates each aberration diagram of the zoom lens of Example 1 in a state where the object at infinity is focused. In FIG. 3, in order from the left, spherical aberration, astigmatism, distortion, and lateral chromatic aberration are illustrated. In FIG. 3, aberration in the wide angle end state is illustrated in an upper part denoted by "WIDE", aberration in the middle focal length state is illustrated in a middle part denoted by "MIDDLE", and aberration in the telephoto end state is illustrated in a lower part denoted by "TELE". In the spherical aberration diagram, a solid line, a long broken line, a short broken line, and a one-dot chain line illustrate aberration on d line, C line, F line, and g line, respectively. In the astigmatism diagram, a solid line illustrates aberration on d line in a sagittal direction, and a short broken line illustrates aberration on d line in a tangential direction. In the distortion diagram, a solid line illustrates aberration on d line. In the lateral chromatic aberration diagram, a long broken line, a short broken line, and a one-dot chain line illustrate aberration on C line, F line, and g line, respectively. In the spherical aberration diagram, FNo. means the F number. In other aberration diagrams, ω means a half angle of view.

Symbols, meanings, writing methods, and illustration methods of each data related to Example 1 are the same in the following examples unless otherwise specified. Thus, duplicate descriptions will be omitted below.

Example 2

Figure 4:
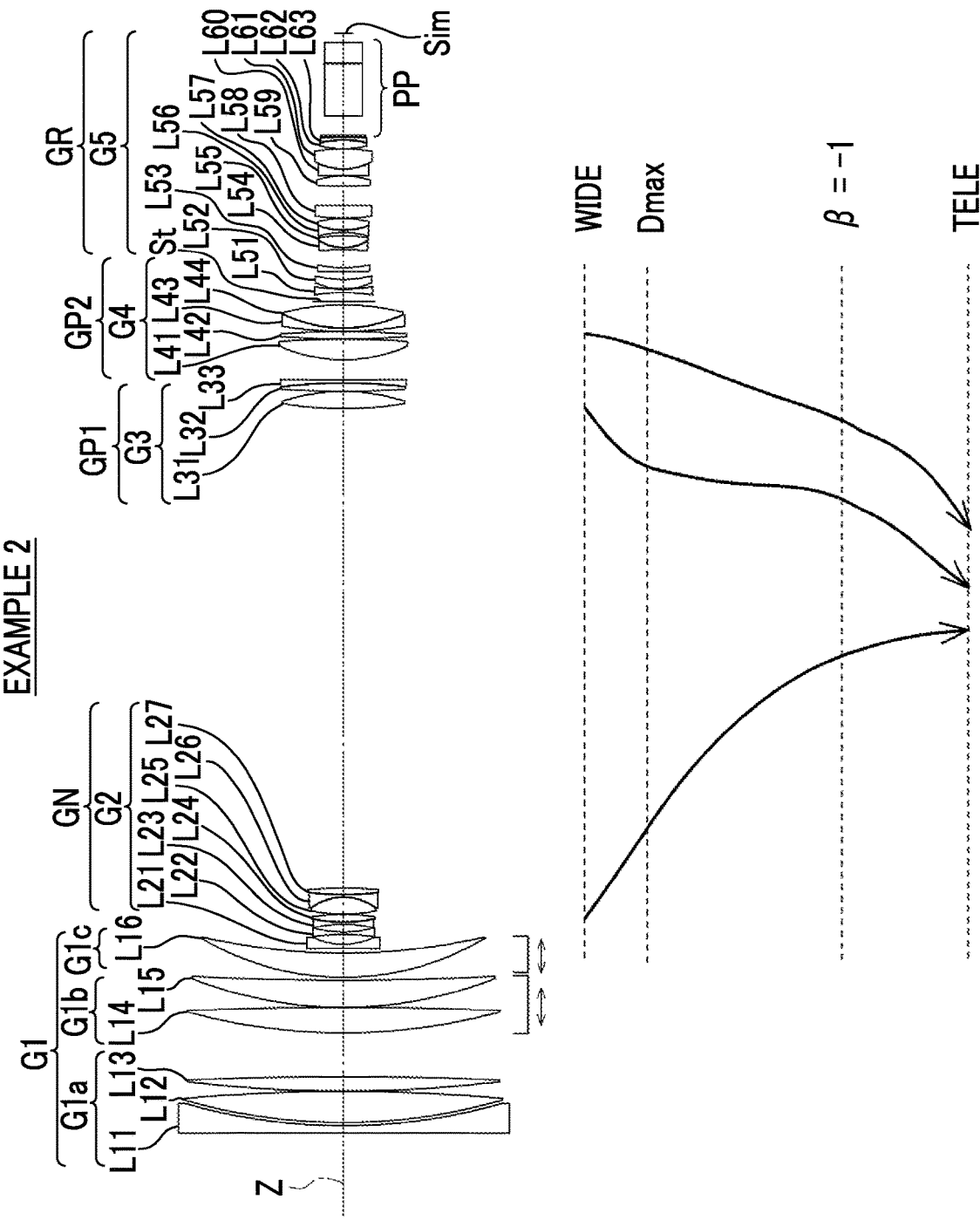
FIG. 4 is a diagram illustrating a cross-sectional view of a configuration and a movement trajectory of a zoom lens of Example 2 of the present disclosure.

A configuration and a movement trajectory of a zoom lens of Example 2 are illustrated in FIG. 4. The zoom lens of Example 2 has the same configuration as the summary of the zoom lens of Example 1. For the zoom lens of Example 2, fundamental lens data is shown in Table 4A and Table 4B, specifications and variable surface intervals are shown in Table 5, aspherical coefficients are shown in Table 6, and each aberration diagram is illustrated in FIG. 5.

TABLE 4A

Example 2

| Sn | R | D | Nd | νd | θgF |
|---|---|---|---|---|---|
| 1 | −19979.28502 | 4.400 | 1.83400 | 37.18 | 0.57780 |
| 2 | 376.22459 | 2.000 | | | |
| 3 | 375.57742 | 19.637 | 1.43387 | 95.18 | 0.53733 |
| 4 | −1160.19070 | 0.120 | | | |
| 5 | 879.73786 | 9.026 | 1.43875 | 94.94 | 0.53433 |
| 6 | −2434.06960 | 27.405 | | | |
| 7 | 387.35889 | 16.262 | 1.43387 | 95.18 | 0.53733 |
| 8 | −2461.01247 | 0.120 | | | |
| 9 | 272.85762 | 16.896 | 1.43875 | 94.94 | 0.53433 |
| 10 | 1978.11923 | 1.818 | | | |
| 11 | 180.85657 | 15.189 | 1.43875 | 94.94 | 0.53433 |
| 12 | 409.89905 | DD[12] | | | |
| *13 | −639.76370 | 2.500 | 1.90619 | 35.82 | 0.58145 |
| 14 | 45.26125 | 6.183 | | | |
| 15 | −142.20901 | 1.500 | 1.90620 | 37.36 | 0.57707 |
| 16 | 76.84764 | 4.882 | | | |
| 17 | −82.50966 | 1.500 | 1.80816 | 40.43 | 0.57160 |
| 18 | 103.88060 | 4.664 | 1.80809 | 22.76 | 0.63073 |
| 19 | −138.87892 | 0.120 | | | |
| 20 | 116.72867 | 10.770 | 1.82942 | 21.81 | 0.63515 |
| 21 | −34.42516 | 1.500 | 1.95000 | 33.09 | 0.58805 |
| 22 | 205.16333 | 4.020 | 1.59410 | 60.47 | 0.55516 |
| 23 | −310.87009 | DD[23] | | | |
| 24 | 242.73790 | 10.808 | 1.43700 | 95.10 | 0.53364 |
| *25 | −124.85625 | 0.120 | | | |
| 26 | 577.42024 | 5.200 | 1.43700 | 95.10 | 0.53364 |
| 27 | −349.07637 | 2.020 | 1.59270 | 35.31 | 0.59336 |
| 28 | 4300.17985 | DD[28] | | | |
| 29 | 100.65446 | 12.865 | 1.43700 | 95.10 | 0.53364 |
| 30 | −597.77109 | 0.128 | | | |
| *31 | 369.66649 | 4.891 | 1.43700 | 95.10 | 0.53364 |
| 32 | −549.97043 | 0.120 | | | |
| 33 | 246.23624 | 2.000 | 1.87448 | 33.15 | 0.58972 |

TABLE 4A-continued

Example 2

| Sn | R | D | Nd | νd | θgF |
|---|---|---|---|---|---|
| 34 | 90.41705 | 14.400 | 1.43700 | 95.10 | 0.53364 |
| 35 | −164.83600 | DD[35] | | | |

TABLE 4B

Example 2

| Sn | R | D | Nd | νd | θgF |
|---|---|---|---|---|---|
| 36 (St) | ∞ | 5.456 | | | |
| 37 | −123.75668 | 2.161 | 1.74287 | 53.71 | 0.54425 |
| 38 | 105.16403 | 0.120 | | | |
| 39 | 42.81302 | 6.066 | 1.83102 | 23.45 | 0.62254 |
| 40 | 79.05565 | 4.825 | | | |
| 41 | −2672.64903 | 2.500 | 1.72047 | 55.48 | 0.54271 |
| 42 | 81.92592 | 11.384 | | | |
| 43 | −445.30361 | 1.500 | 1.85118 | 34.46 | 0.58651 |
| 44 | 28.49834 | 7.274 | 1.72396 | 31.95 | 0.59787 |
| 45 | −133.13767 | 2.162 | | | |
| 46 | −59.55084 | 1.500 | 1.82765 | 46.46 | 0.55725 |
| 47 | 45.47260 | 7.368 | 1.56016 | 51.59 | 0.55655 |
| 48 | −60.98734 | 0.120 | | | |
| 49 | 118.49330 | 8.036 | 1.88994 | 20.50 | 0.62923 |
| 50 | 3965.21386 | 11.953 | | | |
| 51 | 251.77149 | 6.665 | 1.64146 | 59.43 | 0.54234 |
| 52 | −52.65705 | 0.120 | | | |
| 53 | −1081.71282 | 3.902 | 1.93599 | 34.40 | 0.58469 |
| 54 | 39.52121 | 0.120 | | | |
| 55 | 38.73223 | 12.587 | 1.45836 | 84.89 | 0.50545 |
| 56 | −112.80653 | 0.120 | | | |
| 57 | 67.42095 | 5.510 | 1.74390 | 30.16 | 0.59875 |
| 58 | −63.26034 | 1.800 | 1.97261 | 16.53 | 0.66663 |
| 59 | −257.08876 | 0.250 | | | |
| 60 | ∞ | 1.000 | 1.51633 | 64.14 | 0.53531 |
| 61 | ∞ | 11.815 | | | |
| 62 | ∞ | 33.000 | 1.60863 | 46.60 | 0.56787 |
| 63 | ∞ | 13.200 | 1.51633 | 64.05 | 0.53463 |
| 64 | ∞ | 5.511 | | | |

TABLE 5

Example 2

| | WIDE | MIDDLE | TELE |
|---|---|---|---|
| Zr | 1.0 | 28.0 | 120.6 |
| f | 8.273 | 231.631 | 997.667 |
| Bf | 47.455 | 47.455 | 47.455 |
| FNo. | 1.76 | 1.80 | 5.18 |
| 2ω (°) | 70.4 | 2.6 | 0.6 |
| DD[12] | 3.009 | 172.366 | 186.410 |
| DD[23] | 300.438 | 69.456 | 2.844 |
| DD[28] | 12.454 | 15.582 | 2.987 |
| DD[35] | 2.247 | 60.744 | 125.906 |

TABLE 6

Example 2

| Sn | 13 | 25 | 31 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | 6.3438393E−07 | 2.0128702E−07 | −2.9550844E−07 |
| A5 | 7.6791228E−08 | −9.8169288E−09 | 1.3826476E−08 |
| A6 | −7.7309931E−09 | 1.5316378E−09 | −1.6688302E−09 |
| A7 | −3.1643996E−10 | −1.7021879E−10 | 1.3398339E−11 |
| A8 | 1.5912916E−10 | 8.4370119E−12 | 5.7440881E−12 |
| A9 | −1.7172261E−11 | −9.8454833E−14 | −2.5059424E−13 |

TABLE 6-continued

Example 2

| Sn | 13 | 25 | 31 |
|---|---|---|---|
| A10 | 7.0064058E−13 | −4.3453113E−15 | −9.5003421E−16 |
| A11 | 1.8606267E−14 | 5.5846966E−17 | 2.3332275E−16 |
| A12 | −2.8394809E−15 | 3.5313772E−19 | −1.0776179E−18 |
| A13 | 6.5234868E−17 | 2.7502736E−19 | −1.8494947E−19 |
| A14 | 2.5807864E−18 | −1.4230041E−20 | 4.5998255E−21 |
| A15 | −1.4672685E−19 | 2.5927640E−22 | −3.8123231E−23 |
| A16 | 1.9648262E−21 | −1.6718312E−24 | 6.8746386E−26 |

Example 3

Figure 6:
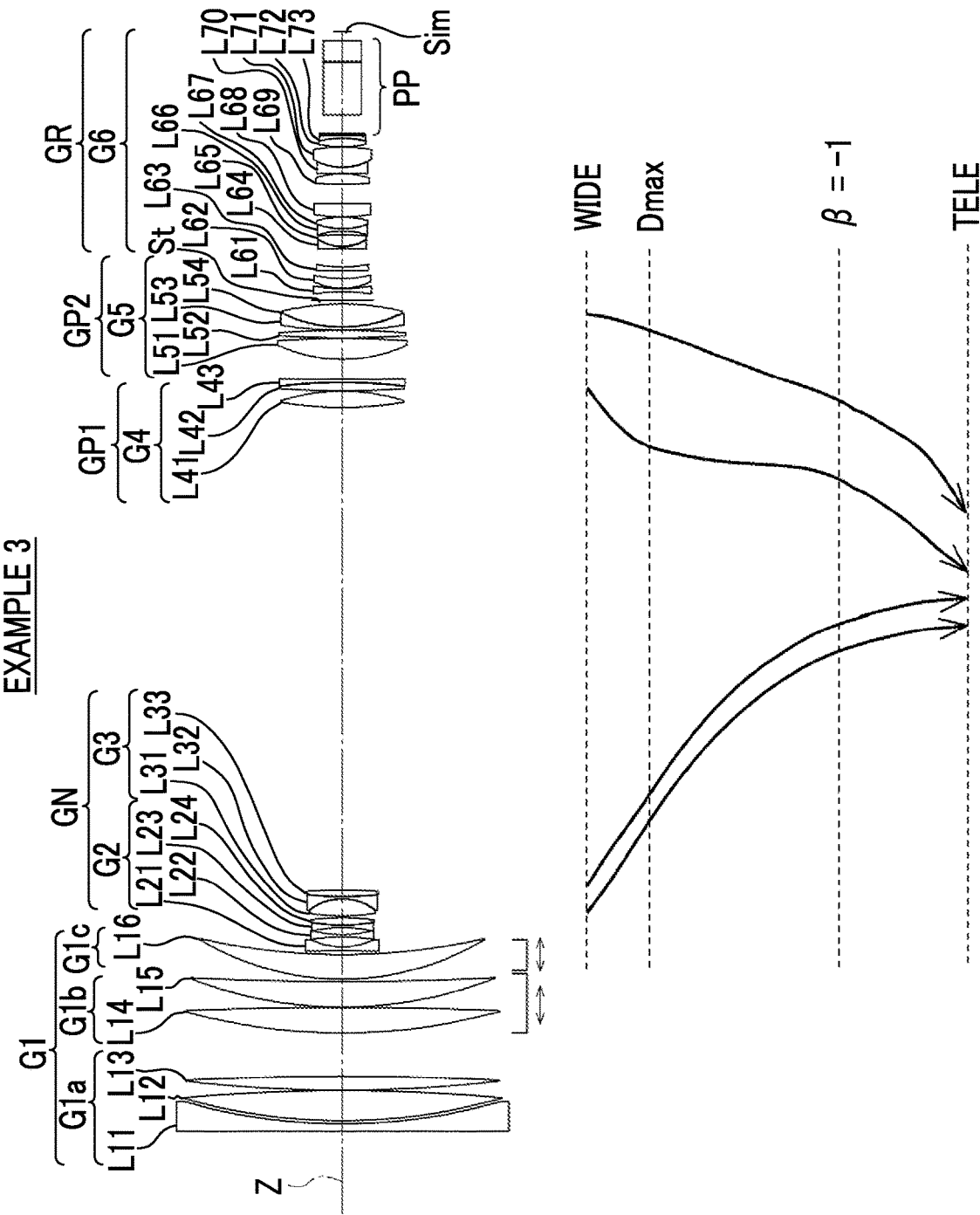
FIG. 6 is a diagram illustrating a cross-sectional view of a configuration and a movement trajectory of a zoom lens of Example 3 of the present disclosure.

For a zoom lens of Example 3, a configuration and a movement trajectory are illustrated in FIG. 6, and the configuration and luminous flux are illustrated in FIG. 7. The zoom lens of Example 3 consists of, in order from the object side to the image side, the first lens group G1 having a positive refractive power, the second lens group G2 having a negative refractive power, the third lens group G3 having a positive refractive power, the fourth lens group G4 having a positive refractive power, the fifth lens group G5 having a positive refractive power, and a sixth lens group G6 having a positive refractive power. During zooming, the first lens group G1 and the sixth lens group G6 are fixed with respect to the image surface Sim, and the second lens group G2, the third lens group G3, the fourth lens group G4, and the fifth lens group G5 are moved along the optical axis Z by changing intervals between adjacent lens groups. In FIG. 6, the movement trajectory of each lens group during zooming from the wide angle end to the telephoto end is schematically illustrated by a solid arrow below each of the second lens group G2, the third lens group G3, the fourth lens group G4, and the fifth lens group G5. In the zoom lens of Example 3, the negative moving lens group GN consists of two lens groups. The second lens group G2 and the third lens group G3 correspond to the negative moving lens group GN. The fourth lens group G4 corresponds to the first positive moving lens group GP1. The fifth lens group G5 corresponds to the second positive moving lens group GP2. The sixth lens group G6 corresponds to the subsequent lens group GR. The first lens group G1 consists of the first a lens group G1a, the first b lens group G1b, and the first c lens group G1c in order from the object side to the image side. During focusing from the object at infinity to an object in a short range, the first b lens group G1b and the first c lens group G1c are moved to the object side by changing a mutual interval, and all of the other lens groups are fixed with respect to the image surface Sim. The first a lens group G1a consists of three lenses of the lenses L11 to L13 in order from the object side to the image side. The first b lens group G1b consists of two lenses of the lenses L14 and L15 in order from the object side to the image side. The first c lens group G1c consists of one lens of the lens L16. The second lens group G2 consists of four lenses of the lenses L21 to L24 in order from the object side to the image side. The third lens group G3 consists of three lenses of the lenses L31 to L33 in order from the object side to the image side. The fourth lens group G4 consists of three lenses of the lenses L41 to L43 in order from the object side to the image side. The fifth lens group G5 consists of four lenses of the lenses L51 to L54 in order from the object side to the image side. The sixth lens group G6 consists of the aperture stop St and 13 lenses of lenses L61 to L73 in order from the object side to the image side. Above is the summary of the zoom lens of Example 3.

For the zoom lens of Example 3, fundamental lens data is shown in Table 7A and Table 7B, specifications and variable surface intervals are shown in Table 8, aspherical coefficients are shown in Table 9, and each aberration diagram is illustrated in FIG. 8.

TABLE 7A

Example 3

| Sn | R | D | Nd | νd | θgF |
|---|---|---|---|---|---|
| 1 | −20835.65169 | 4.400 | 1.83400 | 37.18 | 0.57780 |
| 2 | 376.28625 | 2.000 | | | |
| 3 | 375.62687 | 18.807 | 1.43387 | 95.18 | 0.53733 |
| 4 | −1156.15289 | 0.120 | | | |
| 5 | 877.21908 | 8.612 | 1.43875 | 94.94 | 0.53433 |
| 6 | −2415.89549 | 27.219 | | | |
| 7 | 386.96457 | 15.914 | 1.43387 | 95.18 | 0.53733 |
| 8 | −2465.67317 | 0.120 | | | |
| 9 | 272.46329 | 15.981 | 1.43875 | 94.94 | 0.53433 |
| 10 | 1977.04637 | 1.501 | | | |
| 11 | 180.39654 | 15.189 | 1.43875 | 94.94 | 0.53433 |
| 12 | 409.84553 | DD[12] | | | |
| *13 | −638.19838 | 2.500 | 1.90619 | 35.98 | 0.58100 |
| 14 | 45.23044 | 6.183 | | | |
| 15 | −141.97026 | 1.500 | 1.90620 | 37.74 | 0.57602 |
| 16 | 76.79880 | 4.438 | | | |
| 17 | −82.42478 | 1.500 | 1.80868 | 40.43 | 0.57157 |
| 18 | 111.64068 | 4.663 | 1.80756 | 22.78 | 0.63062 |
| 19 | −139.16530 | DD[19] | | | |
| 20 | 116.84688 | 10.770 | 1.82934 | 21.81 | 0.63514 |
| 21 | −34.50935 | 1.500 | 1.95000 | 33.09 | 0.58804 |
| 22 | 204.52983 | 4.020 | 1.59410 | 60.47 | 0.55516 |
| 23 | −312.66000 | DD[23] | | | |
| 24 | 243.04852 | 10.244 | 1.43700 | 95.10 | 0.53364 |
| *25 | −124.89150 | 0.120 | | | |
| 26 | 580.96783 | 5.200 | 1.43700 | 95.10 | 0.53364 |
| 27 | −345.07965 | 2.020 | 1.59270 | 35.31 | 0.59336 |
| 28 | 4155.82719 | DD[28] | | | |
| 29 | 100.64936 | 12.979 | 1.43700 | 95.10 | 0.53364 |
| 30 | −598.44413 | 0.201 | | | |
| *31 | 368.80746 | 4.859 | 1.43700 | 95.10 | 0.53364 |
| 32 | −554.61142 | 0.120 | | | |
| 33 | 246.78912 | 2.000 | 1.87573 | 33.07 | 0.58993 |
| 34 | 90.30287 | 14.369 | 1.43700 | 95.10 | 0.53364 |
| 35 | −165.06917 | DD[35] | | | |

TABLE 7B

Example 3

| Sn | R | D | Nd | νd | θgF |
|---|---|---|---|---|---|
| 36 (St) | ∞ | 5.443 | | | |
| 37 | −123.66864 | 2.152 | 1.74013 | 53.99 | 0.54392 |
| 38 | 106.23972 | 0.120 | | | |
| 39 | 43.07978 | 6.038 | 1.82873 | 23.56 | 0.62166 |
| 40 | 79.41060 | 4.793 | | | |
| 41 | −2045.29618 | 2.417 | 1.71427 | 55.75 | 0.54278 |
| 42 | 81.84372 | 11.272 | | | |
| 43 | −450.84998 | 1.500 | 1.85111 | 33.90 | 0.58814 |
| 44 | 28.54578 | 7.398 | 1.72407 | 31.81 | 0.59828 |
| 45 | −132.79641 | 2.089 | | | |
| 46 | −59.56628 | 1.522 | 1.82755 | 46.41 | 0.55735 |
| 47 | 45.48327 | 7.378 | 1.56028 | 51.74 | 0.55624 |
| 48 | −60.94569 | 0.120 | | | |
| 49 | 118.37886 | 8.225 | 1.89083 | 20.46 | 0.62941 |
| 50 | 4081.97394 | 12.053 | | | |
| 51 | 251.30507 | 6.682 | 1.64159 | 59.42 | 0.54234 |
| 52 | −52.64719 | 0.120 | | | |
| 53 | −1086.74320 | 3.764 | 1.93580 | 34.41 | 0.58467 |
| 54 | 39.52357 | 0.120 | | | |
| 55 | 38.73128 | 12.447 | 1.45850 | 86.38 | 0.50346 |
| 56 | −112.66691 | 0.120 | | | |
| 57 | 67.33817 | 5.510 | 1.74408 | 29.70 | 0.59983 |
| 58 | −63.27986 | 1.811 | 1.97235 | 16.86 | 0.66452 |
| 59 | −256.78118 | 0.250 | | | |

TABLE 7B-continued

Example 3

| Sn | R | D | Nd | vd | θgF |
|---|---|---|---|---|---|
| 60 | ∞ | 1.000 | 1.51633 | 64.14 | 0.53531 |
| 61 | ∞ | 11.915 | | | |
| 62 | ∞ | 33.000 | 1.60863 | 46.60 | 0.56787 |
| 63 | ∞ | 13.200 | 1.51633 | 64.05 | 0.53463 |
| 64 | ∞ | 5.509 | | | |

TABLE 8

Example 3

| | WIDE | MIDDLE | TELE |
|---|---|---|---|
| Zr | 1.0 | 28.0 | 125.2 |
| f | 8.120 | 227.365 | 1016.564 |
| Bf | 47.553 | 47.553 | 47.553 |
| FNo. | 1.76 | 1.77 | 5.29 |
| 2ω (°) | 71.8 | 2.8 | 0.6 |
| DD[12] | 2.341 | 172.008 | 186.290 |
| DD[19] | 0.961 | 1.161 | 0.962 |
| DD[23] | 301.106 | 69.423 | 1.323 |
| DD[28] | 12.765 | 15.893 | 2.270 |
| DD[35] | 2.051 | 60.739 | 128.378 |

TABLE 9

Example 3

| Sn | 13 | 25 | 31 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | 6.3438393E−07 | 2.0128702E−07 | −2.9550844E−07 |
| A5 | 7.6791228E−08 | −9.8169288E−09 | 1.3826476E−08 |
| A6 | −7.7309931E−09 | 1.5316378E−09 | −1.6688302E−09 |
| A7 | −3.1643996E−10 | −1.7021879E−10 | 1.3398339E−11 |
| A8 | 1.5912916E−10 | 8.4370119E−12 | 5.7440881E−12 |
| A9 | −1.7172261E−11 | −9.8454833E−14 | −2.5059424E−13 |
| A10 | 7.0064058E−13 | −4.3453113E−15 | −9.5003421E−16 |
| A11 | 1.8606267E−14 | 5.5846966E−17 | 2.3332275E−16 |
| A12 | −2.8394809E−15 | 3.5313772E−19 | −1.0776179E−18 |
| A13 | 6.5234868E−17 | 2.7502736E−19 | −1.8494947E−19 |
| A14 | 2.5807864E−18 | −1.4230041E−20 | 4.5998255E−21 |
| A15 | −1.4672685E−19 | 2.5927640E−22 | −3.8123231E−23 |
| A16 | 1.9648262E−21 | −1.6718312E−24 | 6.8746386E−26 |

Example 4

Figure 9:
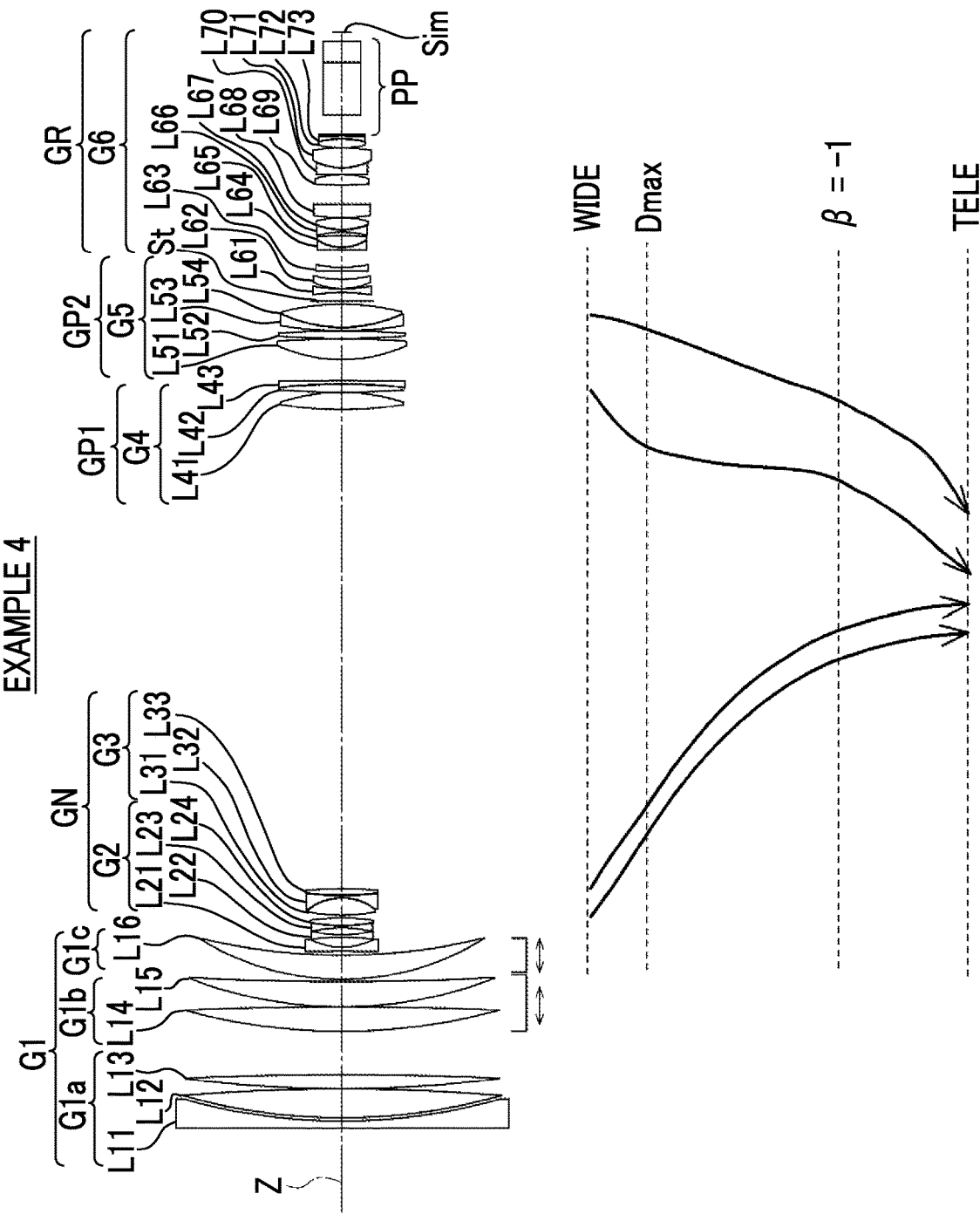
FIG. 9 is a diagram illustrating a cross-sectional view of a configuration and a movement trajectory of a zoom lens of Example 4 of the present disclosure.

A configuration and a movement trajectory of a zoom lens of Example 4 are illustrated in FIG. 9. The zoom lens of Example 4 has the same configuration as the summary of the zoom lens of Example 3. For the zoom lens of Example 4, fundamental lens data is shown in Table 10A and Table 10B, specifications and variable surface intervals are shown in Table 11, aspherical coefficients are shown in Table 12, and each aberration diagram is illustrated in FIG. 10.

TABLE 10A

Example 4

| Sn | R | D | Nd | d | gF |
|---|---|---|---|---|---|
| 1 | −36008.04337 | 4.400 | 1.83400 | 37.18 | 0.57780 |
| 2 | 378.86570 | 2.000 | | | |
| 3 | 376.42706 | 18.131 | 1.43387 | 95.18 | 0.53733 |
| 4 | −1223.16988 | 0.120 | | | |
| 5 | 818.14991 | 8.613 | 1.43875 | 94.94 | 0.53433 |

TABLE 10A-continued

Example 4

| Sn | R | D | Nd | d | gF |
|---|---|---|---|---|---|
| 6 | −2301.80775 | 27.161 | | | |
| 7 | 388.21899 | 15.567 | 1.43387 | 95.18 | 0.53733 |
| 8 | −2513.81139 | 0.120 | | | |
| 9 | 276.19329 | 15.665 | 1.43875 | 94.94 | 0.53433 |
| 10 | 1912.08396 | 1.470 | | | |
| 11 | 174.56396 | 15.189 | 1.43875 | 94.94 | 0.53433 |
| 12 | 393.61945 | DD[12] | | | |
| *13 | −689.22713 | 2.500 | 1.90620 | 36.05 | 0.58080 |
| 14 | 44.65746 | 6.183 | | | |
| 15 | −140.72112 | 1.500 | 1.90619 | 37.80 | 0.57584 |
| 16 | 76.48503 | 4.400 | | | |
| 17 | −81.78691 | 1.500 | 1.81247 | 40.07 | 0.57232 |
| 18 | 126.90606 | 4.663 | 1.80690 | 22.81 | 0.63049 |
| 19 | −142.56847 | DD[19] | | | |
| 20 | 118.59802 | 10.893 | 1.82922 | 21.82 | 0.63511 |
| 21 | −34.74526 | 1.500 | 1.95000 | 33.07 | 0.58811 |
| 22 | 200.60599 | 4.020 | 1.59410 | 60.47 | 0.55516 |
| 23 | −334.12641 | DD[23] | | | |
| 24 | 244.29768 | 10.779 | 1.43700 | 95.10 | 0.53364 |
| *25 | −123.81759 | 0.120 | | | |
| 26 | 599.47022 | 5.200 | 1.41390 | 100.82 | 0.53373 |
| 27 | −350.29665 | 2.020 | 1.69220 | 29.64 | 0.60116 |
| 28 | −2944.90692 | DD[28] | | | |
| 29 | 100.62182 | 12.961 | 1.43700 | 95.10 | 0.53364 |
| 30 | −583.48762 | 0.227 | | | |
| *31 | 362.03413 | 4.791 | 1.43700 | 95.10 | 0.53364 |
| 32 | −557.09258 | 0.120 | | | |
| 33 | 251.93172 | 2.000 | 1.87633 | 36.03 | 0.58082 |
| 34 | 89.93057 | 14.320 | 1.43700 | 95.10 | 0.53364 |
| 35 | −164.45465 | DD[35] | | | |

TABLE 10B

Example 4

| Sn | R | D | Nd | vd | θgF |
|---|---|---|---|---|---|
| 36 (St) | ∞ | 5.488 | | | |
| 37 | −124.74549 | 2.193 | 1.73778 | 54.22 | 0.54363 |
| 38 | 106.94709 | 0.120 | | | |
| 39 | 43.02425 | 6.079 | 1.83076 | 23.46 | 0.62245 |
| 40 | 79.98480 | 4.835 | | | |
| 41 | −3145.16912 | 2.446 | 1.71863 | 47.72 | 0.55989 |
| 42 | 81.36354 | 11.327 | | | |
| 43 | −453.06834 | 1.537 | 1.85046 | 34.24 | 0.58719 |
| 44 | 28.61001 | 7.456 | 1.72463 | 31.52 | 0.59910 |
| 45 | −132.63507 | 2.116 | | | |
| 46 | −59.64035 | 1.522 | 1.82708 | 46.44 | 0.55731 |
| 47 | 45.48292 | 7.364 | 1.56064 | 48.24 | 0.56321 |
| 48 | −60.92361 | 0.120 | | | |
| 49 | 118.65254 | 8.276 | 1.89115 | 21.12 | 0.62734 |
| 50 | 3852.05531 | 12.097 | | | |
| 51 | 253.74777 | 6.697 | 1.64109 | 59.45 | 0.54233 |
| 52 | −52.71089 | 0.120 | | | |
| 53 | −1064.61974 | 3.818 | 1.93617 | 34.38 | 0.58474 |
| 54 | 39.44576 | 0.120 | | | |
| 55 | 38.80144 | 12.439 | 1.45734 | 86.56 | 0.50306 |
| 56 | −112.87571 | 0.120 | | | |
| 57 | 67.68486 | 5.510 | 1.74321 | 30.58 | 0.59777 |
| 58 | −63.22808 | 1.800 | 1.97233 | 16.64 | 0.66592 |
| 59 | −258.70498 | 0.250 | | | |
| 60 | ∞ | 1.000 | 1.51633 | 64.14 | 0.53531 |
| 61 | ∞ | 11.744 | | | |
| 62 | ∞ | 33.000 | 1.60863 | 46.60 | 0.56787 |
| 63 | ∞ | 13.200 | 1.51633 | 64.05 | 0.53463 |
| 64 | ∞ | 5.509 | | | |

TABLE 11

| | Example 4 | | |
|---|---|---|---|
| | WIDE | MIDDLE | TELE |
| Zr | 1.0 | 28.0 | 125.2 |
| f | 8.105 | 226.929 | 1014.614 |
| Bf | 47.382 | 47.382 | 47.382 |
| FNo. | 1.76 | 1.80 | 5.24 |
| 2ω (°) | 71.6 | 2.8 | 0.6 |
| DD[12] | 2.463 | 169.812 | 183.787 |
| DD[19] | 1.682 | 1.882 | 1.683 |
| DD[23] | 299.727 | 70.296 | 2.748 |
| DD[28] | 13.130 | 16.258 | 2.635 |
| DD[35] | 2.060 | 60.814 | 128.209 |

TABLE 12

| | Example 4 | | |
|---|---|---|---|
| Sn | 13 | 25 | 31 |
| KA | 1.0000000E+00 | 1.0000000E+00 | 1.0000000E+00 |
| A3 | 0.0000000E+00 | 0.0000000E+00 | 0.0000000E+00 |
| A4 | 6.3438393E−07 | 2.0128702E−07 | −2.9550844E−07 |
| A5 | 7.6791228E−08 | −9.8169288E−09 | 1.3826476E−08 |
| A6 | −7.7309931E−09 | 1.5316378E−09 | −1.6688302E−09 |
| A7 | −3.1643996E−10 | −1.7021879E−10 | 1.3398339E−11 |
| A8 | 1.5912916E−10 | 8.4370119E−12 | 5.7440881E−12 |
| A9 | −1.7172261E−11 | −9.8454833E−14 | −2.5059424E−13 |
| A10 | 7.0064058E−13 | −4.3453113E−15 | −9.5003421E−16 |
| A11 | 1.8606267E−14 | 5.5846966E−17 | 2.3332275E−16 |
| A12 | −2.8394809E−15 | 3.5313772E−19 | −1.0776179E−18 |
| A13 | 6.5234868E−17 | 2.7502736E−19 | −1.8494947E−19 |
| A14 | 2.5807864E−18 | −1.4230041E−20 | 4.5998255E−21 |
| A15 | −1.4672685E−19 | 2.5927640E−22 | −3.8123231E−23 |
| A16 | 1.9648262E−21 | −1.6718312E−24 | 6.8746386E−26 |

Example 5

Figure 11:
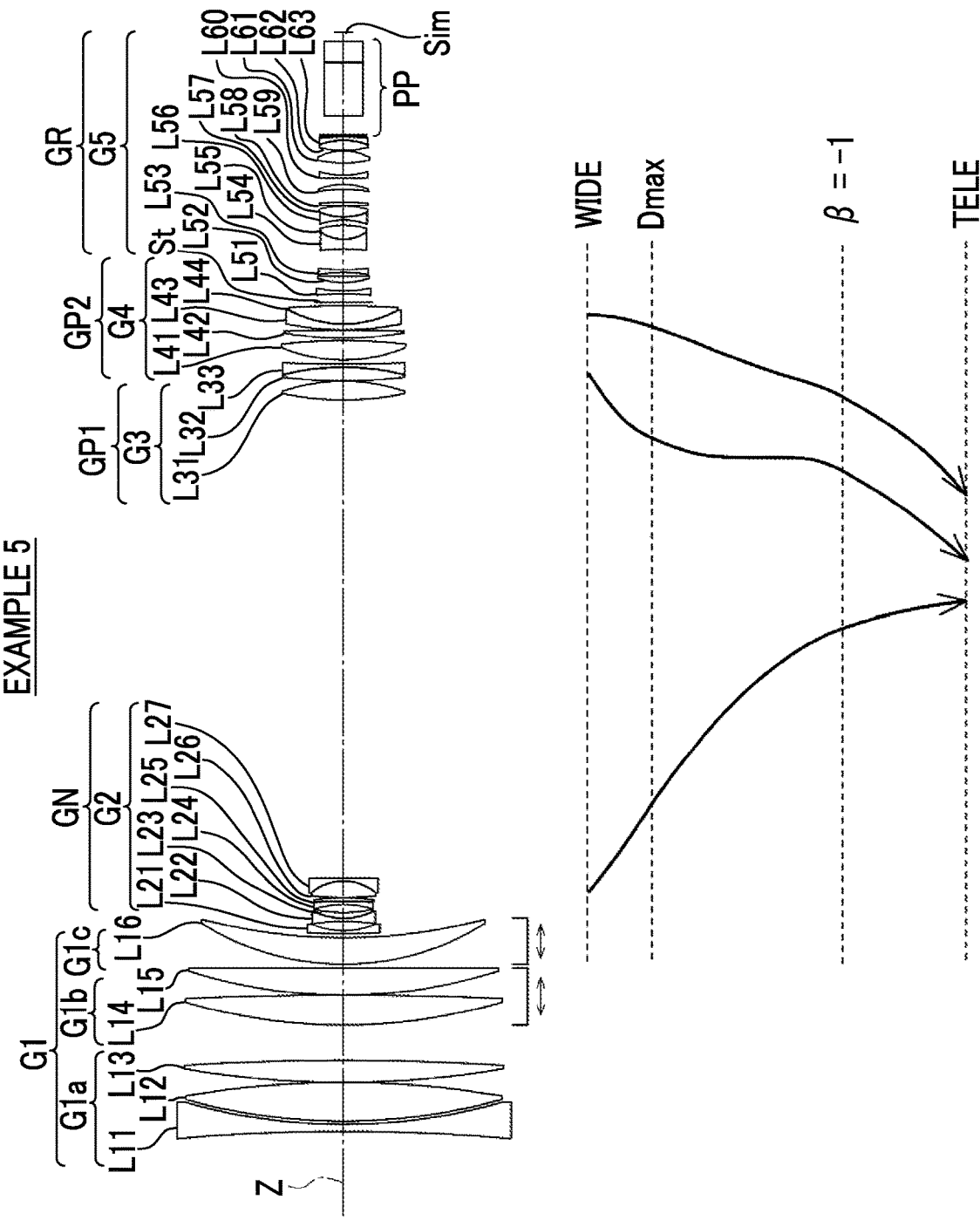
FIG. 11 is a diagram illustrating a cross-sectional view of a configuration and a movement trajectory of a zoom lens of Example 5 of the present disclosure.

A configuration and a movement trajectory of a zoom lens of Example 5 are illustrated in FIG. 11. The zoom lens of Example 5 has the same configuration as the summary of the zoom lens of Example 1. For the zoom lens of Example 5, fundamental lens data is shown in Table 13A and Table 13B, specifications and variable surface intervals are shown in Table 14, aspherical coefficients are shown in Table 15, and each aberration diagram is illustrated in FIG. 12.

TABLE 13A

| | Example 5 | | | | |
|---|---|---|---|---|---|
| Sn | R | D | Nd | vd | θgF |
| 1 | −1247.24500 | 4.400 | 1.83481 | 42.73 | 0.56481 |
| 2 | 378.17990 | 2.000 | | | |
| 3 | 384.66501 | 23.905 | 1.43387 | 95.18 | 0.53733 |
| 4 | −620.71480 | 0.120 | | | |
| 5 | 607.95739 | 13.672 | 1.43387 | 95.18 | 0.53733 |
| 6 | −1635.54315 | 22.044 | | | |
| 7 | 357.64078 | 18.727 | 1.43387 | 95.18 | 0.53733 |
| 8 | −2323.86403 | 0.120 | | | |
| 9 | 333.52184 | 16.884 | 1.43875 | 94.94 | 0.53433 |
| 10 | ∞ | 2.271 | | | |
| 11 | 172.83587 | 16.561 | 1.43875 | 94.94 | 0.53433 |
| 12 | 362.63143 | DD[12] | | | |
| *13 | 435.75278 | 1.862 | 1.90366 | 31.31 | 0.59481 |
| 14 | 53.61935 | 5.888 | | | |
| 15 | −124.90000 | 1.800 | 1.87070 | 40.73 | 0.56825 |
| 16 | 43.07230 | 3.495 | 1.49700 | 81.61 | 0.53887 |
| 17 | 85.30127 | 5.072 | | | |
| 18 | −60.50976 | 1.820 | 1.88300 | 40.76 | 0.56679 |
| 19 | −3479.99444 | 2.391 | 1.94595 | 17.98 | 0.65460 |

TABLE 13A-continued

| | Example 5 | | | | |
|---|---|---|---|---|---|
| Sn | R | D | Nd | vd | θgF |
| 20 | −138.69469 | 0.120 | | | |
| 21 | 217.53448 | 10.316 | 1.80518 | 25.42 | 0.61616 |
| 22 | −31.70522 | 1.820 | 1.80400 | 46.53 | 0.55775 |
| 23 | −931.64568 | DD[23] | | | |
| 24 | 197.33862 | 11.635 | 1.49700 | 81.54 | 0.53748 |
| *25 | −116.78713 | 0.120 | | | |
| 26 | 338.03978 | 8.590 | 1.43700 | 95.10 | 0.53364 |
| 27 | −154.07793 | 1.820 | 1.59270 | 35.31 | 0.59336 |
| 28 | 903.60083 | DD[28] | | | |
| 29 | 102.17632 | 12.042 | 1.43700 | 95.10 | 0.53364 |
| 30 | −357.01739 | 1.488 | | | |
| *31 | 190.97599 | 4.923 | 1.43700 | 95.10 | 0.53364 |
| 32 | −1341.73050 | 0.305 | | | |
| 33 | 183.93205 | 3.502 | 1.80440 | 39.59 | 0.57297 |
| 34 | 71.03957 | 11.361 | 1.43700 | 95.10 | 0.53364 |
| 35 | −596.98574 | DD[35] | | | |

TABLE 13B

| | Example 5 | | | | |
|---|---|---|---|---|---|
| Sn | R | D | Nd | vd | θgF |
| 36 (St) | ∞ | 5.210 | | | |
| 37 | −179.42575 | 1.800 | 1.80139 | 45.45 | 0.55814 |
| 38 | 82.74660 | 5.282 | | | |
| 39 | 49.90039 | 3.622 | 1.84666 | 23.78 | 0.61923 |
| 40 | 297.42629 | 2.442 | | | |
| 41 | −112.44053 | 1.800 | 1.80400 | 46.53 | 0.55775 |
| 42 | 136.69219 | 13.203 | | | |
| 43 | −108.07011 | 6.051 | 1.72916 | 54.09 | 0.54490 |
| 44 | 25.68443 | 8.831 | 1.63980 | 34.47 | 0.59233 |
| 45 | −54.46125 | 3.071 | | | |
| 46 | −46.99407 | 1.988 | 1.77250 | 49.60 | 0.55212 |
| 47 | 39.66945 | 6.922 | 1.54814 | 45.78 | 0.56859 |
| 48 | −55.57389 | 0.120 | | | |
| 49 | 884.41655 | 2.120 | 1.51742 | 52.43 | 0.55649 |
| 50 | −144.84593 | 7.934 | | | |
| 51 | −97.87116 | 3.030 | 1.48749 | 70.24 | 0.53007 |
| 52 | −42.84697 | 4.043 | | | |
| 53 | 1151.08531 | 1.800 | 1.96300 | 24.11 | 0.62126 |
| 54 | 57.15854 | 7.468 | | | |
| 55 | 74.21323 | 7.643 | 1.51742 | 52.43 | 0.55649 |
| 56 | −35.33831 | 0.135 | | | |
| 57 | 62.39042 | 6.337 | 1.54072 | 47.23 | 0.56511 |
| 58 | −44.23377 | 2.258 | 2.00069 | 25.46 | 0.61364 |
| 59 | −162.17197 | 0.250 | | | |
| 60 | ∞ | 1.000 | 1.51633 | 64.14 | 0.53531 |
| 61 | ∞ | 11.899 | | | |
| 62 | ∞ | 33.000 | 1.60859 | 46.44 | 0.56664 |
| 63 | ∞ | 13.200 | 1.51633 | 64.05 | 0.53463 |
| 64 | ∞ | 5.510 | | | |

TABLE 14

| | Example 5 | | |
|---|---|---|---|
| | WIDE | MIDDLE | TELE |
| Zr | 1.0 | 21.6 | 120.6 |
| f | 8.297 | 179.363 | 1000.855 |
| Bf | 47.539 | 47.539 | 47.539 |
| FNo. | 1.76 | 1.79 | 5.19 |
| 2ω (°) | 70.2 | 3.4 | 0.6 |
| DD[12] | 2.399 | 162.308 | 181.594 |
| DD[23] | 297.098 | 80.665 | 2.945 |
| DD[28] | 2.497 | 11.964 | 6.252 |
| DD[35] | 2.279 | 49.336 | 113.482 |

TABLE 15

Example 5

| Sn | 13 | 25 | 31 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | −2.0418640E−08 | 1.6774969E−07 | −2.1898905E−07 |
| A5 | 1.7997276E−07 | −8.4229260E−10 | −1.3844130E−09 |
| A6 | −4.5437887E−08 | −2.0469494E−12 | 1.2931566E−09 |
| A7 | 6.6751364E−09 | −6.4965005E−13 | −2.4165943E−10 |
| A8 | −5.9456491E−10 | 3.8125842E−15 | 1.8466846E−11 |
| A9 | 3.4600193E−11 | 2.1729178E−15 | −6.7241617E−13 |
| A10 | −1.7060286E−12 | 1.3528170E−17 | 8.4080445E−15 |
| A11 | 9.6566222E−14 | −1.6168407E−18 | 1.6635466E−16 |
| A12 | −4.4727077E−15 | −1.1639852E−19 | −6.6941235E−18 |
| A13 | 8.4045374E−17 | 6.8007151E−21 | 1.2311712E−19 |
| A14 | 2.0761838E−18 | −1.5682732E−22 | −3.5545539E−21 |
| A15 | −1.1818133E−19 | 2.2116854E−24 | 7.7910896E−23 |
| A16 | 1.4620255E−21 | −1.5630382E−26 | −6.2738171E−25 |

Table 16 shows corresponding values of Conditional Expressions (1) to (7) of the zoom lenses of Examples 1 to 5.

TABLE 16

| Expression Number | | Example 1 | Example 2 | Example 3 | Example 4 | Example 5 |
|---|---|---|---|---|---|---|
| (1) | f1/fNw | −10.127 | −10.121 | −10.081 | −10.219 | −9.923 |
| (2) | fP2/fP1 | 0.774 | 0.673 | 0.674 | 0.676 | 0.806 |
| (3) | vn | 35.27 | 35.31 | 35.31 | 29.64 | 35.31 |
| (4) | vp | 95.10 | 95.10 | 95.10 | 100.82 | 95.10 |
| (5) | θp + 0.001625 × vp | 0.6882 | 0.6882 | 0.6882 | 0.6976 | 0.6882 |
| (6) | fn/fP1 | −1.427 | −2.961 | −2.914 | −3.109 | −1.423 |
| (7) | Ndn | 1.59270 | 1.59270 | 1.59270 | 1.69220 | 1.59270 |

As is perceived from the data described above, even in a case where the zoom lenses of Examples 1 to 5 are configured in a small size, the zoom magnification is greater than or equal to a power of 120, and a high magnification is achieved. In addition, high optical characteristics are implemented by suppressing a change in aberration during zooming and favorably correcting various types of aberration.

Figure 13:
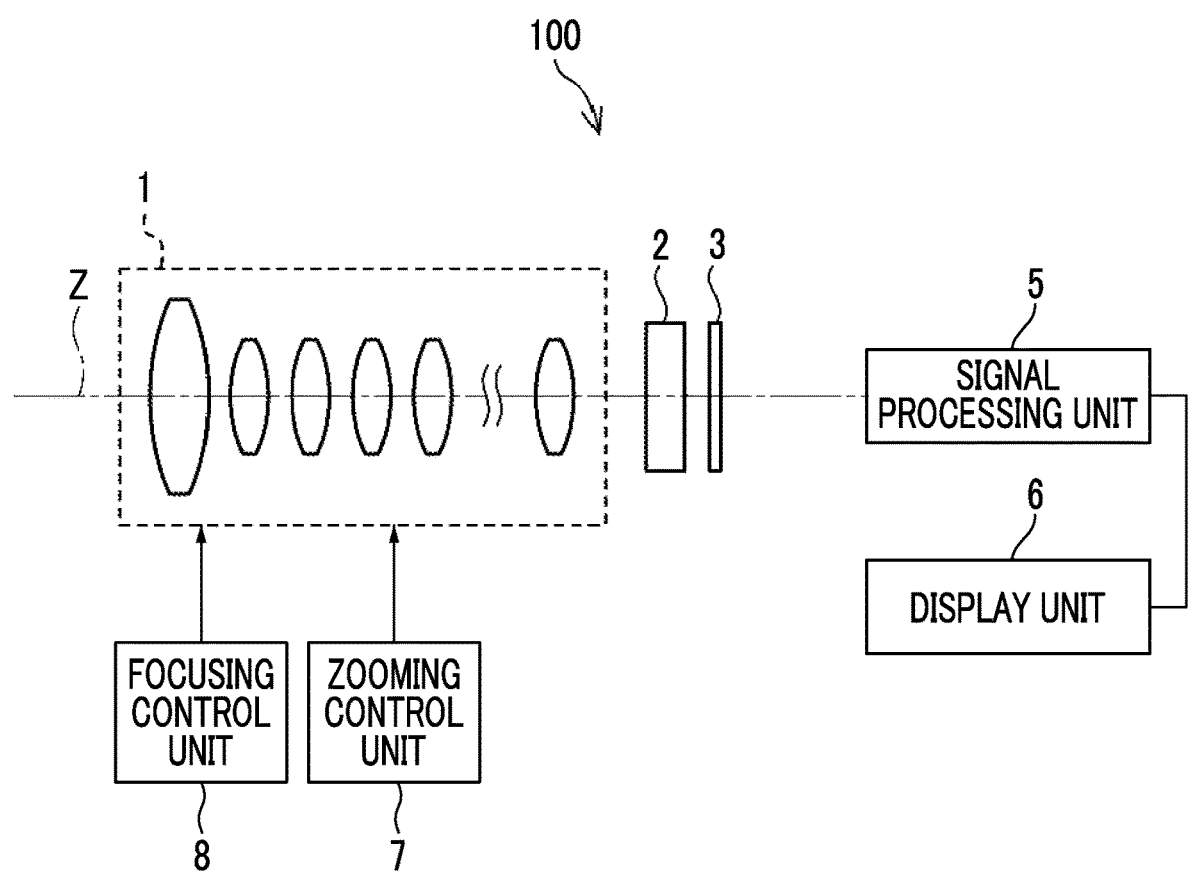
FIG. 13 is a schematic configuration diagram of an imaging apparatus according to one embodiment of the present disclosure.

Next, an imaging apparatus according to the embodiment of the present disclosure will be described. FIG. 13 illustrates a schematic configuration diagram of an imaging apparatus 100 using a zoom lens 1 according to the embodiment of the present disclosure as one example of the imaging apparatus according to the embodiment of the present disclosure. For example, a broadcasting camera, a movie imaging camera, a video camera, and a monitoring camera can be exemplified as the imaging apparatus 100.

The imaging apparatus 100 comprises the zoom lens 1, a filter 2 arranged on the image side of the zoom lens 1, and an imaging element 3 arranged on the image side of the filter 2. In FIG. 13, a plurality of lenses comprised in the zoom lens 1 are schematically illustrated.

The imaging element 3 converts an optical image formed by the zoom lens 1 into an electric signal and can use, for example, a charge coupled device (CCD) or a complementary metal oxide semiconductor (CMOS). The imaging element 3 is arranged such that an imaging surface thereof matches an image surface of the zoom lens 1.

The imaging apparatus 100 also comprises a signal processing unit 5 performing calculation processing on an output signal from the imaging element 3, a display unit 6 displaying an image formed by the signal processing unit 5, a zooming control unit 7 controlling zooming of the zoom lens 1, and a focusing control unit 8 controlling focusing of the zoom lens 1. While only one imaging element 3 is illustrated in FIG. 13, a so-called three-plate type imaging apparatus including three imaging elements may also be used.

While the technology of the present disclosure has been illustratively described with the embodiment and the examples, the technology of the present disclosure is not limited to the embodiment and the examples and can be subjected to various modifications. For example, the radius of curvature, the surface interval, the refractive index, the Abbe number, the aspherical coefficient, and the like of each lens are not limited to the values shown in each example of the numerical values and may have other values.

What is claimed is:

1. A zoom lens consisting of, in order from an object side to an image side:
a first lens group that has a positive refractive power and is fixed with respect to an image surface during zooming;
a negative moving lens group that consists of one or two lens groups moved along an optical axis by changing an interval with an adjacent lens group during zooming, and has a negative refractive power as a whole at a wide angle end;
a first positive moving lens group that has a positive refractive power and is moved along the optical axis during zooming;
a second positive moving lens group that has a positive refractive power and is moved along the optical axis during zooming; and
a subsequent lens group including a stop,
wherein all intervals between adjacent lens groups are changed during zooming,
all lens groups included in the negative moving lens group are moved to the image side during zooming from the wide angle end to a telephoto end,
the first positive moving lens group consists of a single lens that is a positive lens, and a cemented lens configured by cementing two lenses in which any one is a positive lens and the other is a negative lens,
in a state where an object at infinity is focused, in a case where a focal length of the first lens group is denoted by f1, a focal length of the negative moving lens group at the wide angle end is denoted by fNw, a focal length of the first positive moving lens group is denoted by fP1, and a focal length of the second positive moving lens group is denoted by fP2, Conditional Expressions (1a) and (2) are satisfied, which are represented by $$-11.5 < f1/fNw \leq -9.923 \qquad (1a)$$

$$0.5 < fP2/fP1 < 1 \qquad (2),$$

and
in a state where an object at infinity is focused, in a case where a focal length of the negative lens of the first positive moving lens group is denoted by fn, and the focal length of the first positive moving lens group is denoted by fP1, Conditional Expression (6) is satisfied, which is represented by $-4 < fn/fP1 < -1$ (6), and
in a case where a d line-based Abbe number of a positive lens of which the d line-based Abbe number is largest out of the positive lenses included in the first positive moving lens group is denoted by νp, and a partial dispersion ratio, between g line and F line, of the positive lens of which the d line-based Abbe number is largest out of the positive lenses included in the first positive moving lens group is denoted by θp, Conditional Expressions (4) and (5) are satisfied, which are represented by $80 < νp$ (4)

$0.66 < θp + 0.001625 \times νp < 0.72$ (5).

2. The zoom lens according to claim 1,
wherein in a case where a d line-based Abbe number of the negative lens of the first positive moving lens group is denoted by νn, Conditional Expression (3) is satisfied, which is represented by $20 < νn < 40$ (3).

3. The zoom lens according to claim 2,
wherein Conditional Expression (3-1) is satisfied, which is represented by $25 < νn < 37$ (3-1).

4. The zoom lens according to claim 1,
wherein in a case where a refractive index of the negative lens of the first positive moving lens group with respect to d line is denoted by Ndn, Conditional Expression (7) is satisfied, which is represented by $1.55 < Ndn < 1.77$ (7).

5. The zoom lens according to claim 4,
wherein Conditional Expression (7-1) is satisfied, which is represented by $1.57 < Ndn < 1.7$ (7-1).

6. The zoom lens according to claim 1,
wherein the second positive moving lens group at the telephoto end is positioned on the object side from the second positive moving lens group at the wide angle end, and
in a state where an object at infinity is focused, an interval between the first positive moving lens group and the second positive moving lens group is largest on a wide angle side from a zoom position at which a lateral magnification of a combined lens group obtained by combining the first positive moving lens group and the second positive moving lens group is −1.

7. The zoom lens according to claim 1,
wherein in a state where an object at infinity is focused, during zooming from the wide angle end to the telephoto end, a combined lens group obtained by combining the first positive moving lens group and the second positive moving lens group, and the negative moving lens group simultaneously pass through respective points at which lateral magnifications are −1.

8. The zoom lens according to claim 1,
wherein the negative moving lens group consists of one lens group having a negative refractive power.

9. The zoom lens according to claim 1,
wherein the negative moving lens group consists of one lens group having a negative refractive power and one lens group having a positive refractive power in order from the object side to the image side.

10. The zoom lens according to claim 1,
wherein the first lens group comprises at least one lens that is moved along the optical axis during focusing.

11. The zoom lens according to claim 1,
wherein Conditional Expression (1-1a) is satisfied, which is represented by $-11 < f1/fNw \leq -9.923$ (1-1a).

12. The zoom lens according to claim 1,
wherein Conditional Expression (2-1) is satisfied, which is represented by $0.6 < fP2/fP1 < 0.9$ (2-1).

13. The zoom lens according to claim 1,
wherein Conditional Expression (4-1) is satisfied, which is represented by $90 < νp < 105$ (4-1).

14. The zoom lens according to claim 1,
wherein Conditional Expression (5-1) is satisfied, which is represented by $0.67 < θp + 0.001625 \times νp < 0.7$ (5-1).

15. The zoom lens according to claim 1,
wherein Conditional Expression (6-1) is satisfied, which is represented by $-3.5 < fn/fP1 < -1.2$ (6-1).

16. An imaging apparatus comprising:
the zoom lens according to claim 1.

* * * * *